United States Patent
Kimura

(10) Patent No.: US 7,359,075 B2
(45) Date of Patent: Apr. 15, 2008

(54) CONNECTION MANAGEMENT SYSTEM FOR CREATING AND RELEASING CONNECTIONS TO A PRINT SERVER

(75) Inventor: Mitsuo Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 10/278,797

(22) Filed: Oct. 24, 2002

(65) Prior Publication Data

US 2003/0081250 A1 May 1, 2003

(30) Foreign Application Priority Data

Oct. 30, 2001 (JP) .............................. 2001-333272
Aug. 20, 2002 (JP) .............................. 2002-239318

(51) Int. Cl.
*B41J 1/00* (2006.01)
*G06F 15/00* (2006.01)

(52) U.S. Cl. ..................... 358/1.15; 358/434; 358/442; 358/468; 358/400; 358/403; 358/1.16; 358/440; 358/407

(58) Field of Classification Search ..................... None
See application file for complete search history.

(56) References Cited

U.S. PATENT DOCUMENTS 5,625,757 A * 4/1997 Kageyama .................. 395/113
6,222,645 B1* 4/2001 Kagawa ..................... 358/434
6,267,517 B1* 7/2001 Noda ........................ 400/76
7,187,463 B2* 3/2007 Kagawa ..................... 358/1.15

OTHER PUBLICATIONS

RFC 3996, 2566, 2565, 2068☐☐www.rfc-archive.org.*
RFC 2566, 2565, 2068 www.rfc-archive.org.*

* cited by examiner

*Primary Examiner*—Twyler Lamb Haskins
*Assistant Examiner*—Pawandeep S Dhingra
(74) *Attorney, Agent, or Firm*—Fitzpatrick, Cella, Harper & Scinto

(57) ABSTRACT

Print server load is reduced efficiently by deleting information about print clients from a print server based on precise conditions peculiar to a print system.

15 Claims, 19 Drawing Sheets

CONNECTION MANAGEMENT SYSTEM FOR CREATING AND RELEASING CONNECTIONS TO A PRINT SERVER

BACKGROUND OF THE INVENTION

1. Field of the Invention

The present invention relates to an information processing system equipped with a higher-level device which controls printers and the like on a network as well as to the higher-level device and a printer in the information processing system.

2. Related Background Art

Today, personal computers are spreading at a remarkable pace in offices and networking technology for connecting them is also advancing. Regarding usage of printers, whereas one personal computer is connected conventionally with a single printer, nowadays there are increasing cases in which a printer connected to a network is shared by personal computers (PCs) connected to the network.

In an information processing system in which a printer connected to a network is shared by multiple print client PCs connected to the network in this way, scheduling of print jobs on printers is managed collectively by a print server PC and each print client PC transmits print data to the printer according to instructions from the print server PC. Also, information is obtained from the printer by the print server PC and delivered to the print client PCs.

However, the conventional information processing system described above has the problem that increases in the number of printers managed by the print server PC as well as in the number of print client PCs will also increase information about the print client PCs which is held by the print server PC, making it time-consuming for the print server PC to perform internal processing such as information searches, thus resulting in performance degradation of the entire print system.

SUMMARY OF THE INVENTION

The present invention has been made in view of the conventional problem described above. Its object is to provide a mechanism capable of reducing the load on a print server PC or equivalent devices. Thus, the present invention is configured as follows.

The present invention is configured as an information processing apparatus connected via a network with a higher-level device which controls devices on the above described network, comprising: connection control means for performing a connection process for connecting with the above described higher-level device when print data is generated; and connection releasing means for releasing the connection with the above described higher-level device after the above described print data has been processed.

Alternatively, the present invention is configured as an information processing apparatus which processes print jobs received from a higher-level device capable of communicating via a designated communications line, comprising: first registration means for registering client information for the above described higher-level device; second registration means for registering job information associated with the above described client information; deletion means for deleting the above described client information a designated time after completion of job processing; and control means for performing control so as not to delete the above described client information a designated time after job processing associated with the above described job information is completed if there is other job information associated with the above described client information.

Alternatively, the present invention is configured as an information processing apparatus connected via a network with a higher-level device which controls devices on the above described network, comprising: connection control means for performing a connection process for connecting with the above described higher-level device when print data is generated; and connection releasing means for releasing the connection with the above described higher-level device after the above described print data has been processed, wherein the above described connection releasing means releases the connection with the above described higher-level device when a preset time elapses after printing of the above described print data is terminated without confirmation of completion.

Alternatively, the present invention is configured as an information processing apparatus connected via a network with a higher-level device which controls devices on the above described network, comprising: connection control means for performing a connection process for connecting with the above described higher-level device when print data is generated; and connection releasing means for releasing the connection with the above described higher-level device after the above described print data has been processed, wherein the above described connection releasing means releases the connection with the above described higher-level device when a preset time elapses after an instruction to stop printing the above described print data is received.

Alternatively, the present invention is configured as an information processing apparatus connected via a network with a higher-level device which controls devices on the above described network, comprising: means for requesting continuous connection from the above described higher-level device regardless of whether print data is generated; and means for displaying information about rejection on screen if the request is rejected because continuous connection to the devices is not permitted by the above described higher-level device.

Alternatively, the present invention is configured as an information processing system comprising a higher-level device which controls devices on a network and an information processing apparatus connected with the above described higher-level device via the above described network, wherein the above described information processing apparatus comprises connection control means for performing a connection process for connecting with the above described higher-level device after print data is generated; and connection releasing means for releasing the connection with the above described higher-level device after the above described print data has been processed.

DESCRIPTION OF THE PREFERRED
EMBODIMENTS

First Embodiment

Figure 1:
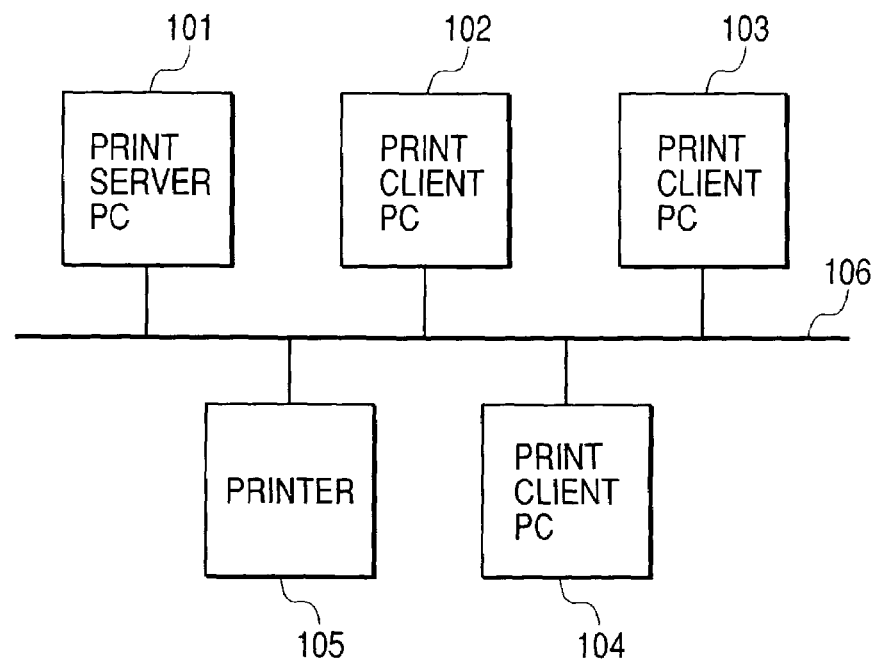
FIG. 1 is a block diagram showing an overall configuration of an information processing system (print system) according to an embodiment of the present invention.

An embodiment of the present invention will be described below with reference to the drawings.
[Overall Configuration of System]
FIG. 1 is a block diagram showing an overall configuration of an information processing system (print system) according to the embodiment of the present invention.

A network system according to the embodiment of the present invention comprises a print server PC 101, print client PCs 102, 103, and 104, and a printer 105 on a network (may be wireless or wired) 106.

In FIG. 1, it is assumed that there are actually n print client PCs 102, 103, and 104, and n printers 105 (although only three clients and one printer are shown in the figure for the sake of simplicity). In this example, the printer 105 is a network printer connected directly to the network 106, but it may be a local printer connected to the print server PC 101.

Referring now in detail to configurations of the above components, the print server PC 101, which is connected to the network 106 via a network cable, receives print data from the print client PCs 102, 103, and 104 and transmits it to the printer 105.

The print client PCs 102, 103, and 104 which are capable of communicating with the network 106 via network cables, passes print data and print information to the print server PC 101.

The printer 105, which is connected to the network 106 via a network interface, converts print data transmitted from the print server PC 101 into dot images page by page and prints it on a page by page basis. The network 106 is connected with the print server PC 101, print client PCs 102, 103, and 104, printer 105, etc.

[Configuration of Print Server PC]

Figure 2:
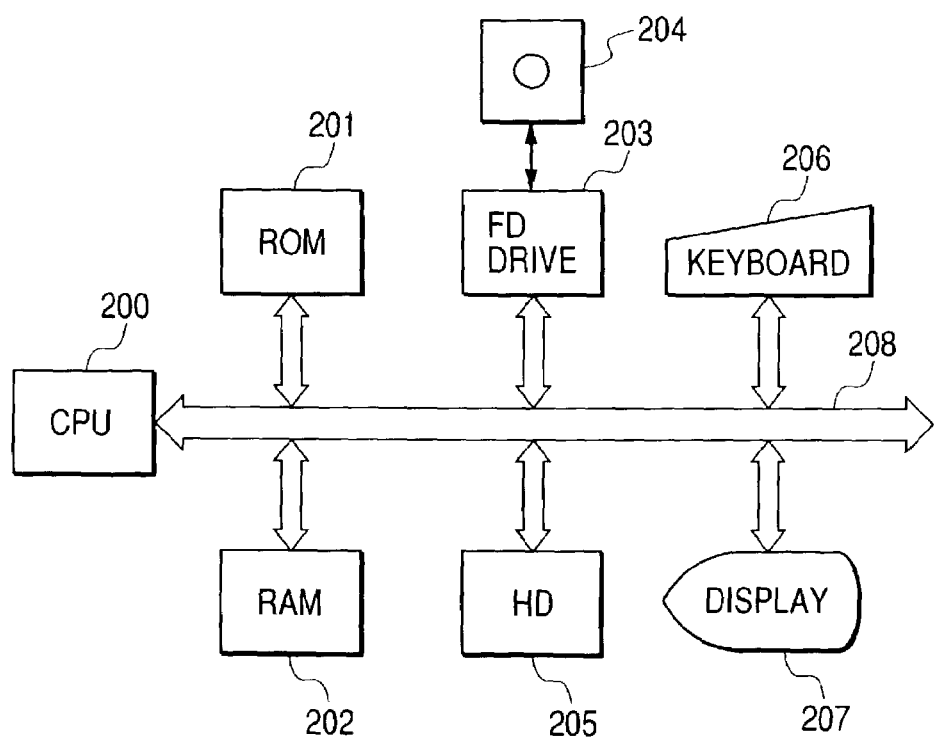
FIG. 2 is a diagram showing a schematic configuration of a print server PC according to the embodiment of the present invention.

FIG. 2 is a diagram showing a schematic configuration of a print server PC and print client PC according to the embodiment of the present invention.

The print server PC 101 and print client PCs 102 to 104 according to this embodiment comprise a CPU 200, ROM 201, RAM 202, FD (floppy (registered trademark) disk) drive 203, FD 204, HD (hard disk) 205, keyboard 206, display 207, and system bus 208.

Referring now in detail to configurations of the above components, the CPU 200 runs an OS (operating system), print server program, etc. stored in the HD 205 and performs control so as to store information needed for execution of programs temporarily in the RAM 202. The ROM 201 stores a basic I/O program and the like. The RAM 202 functions as a main memory, work area, and the like for the CPU 200.

Figure 3:
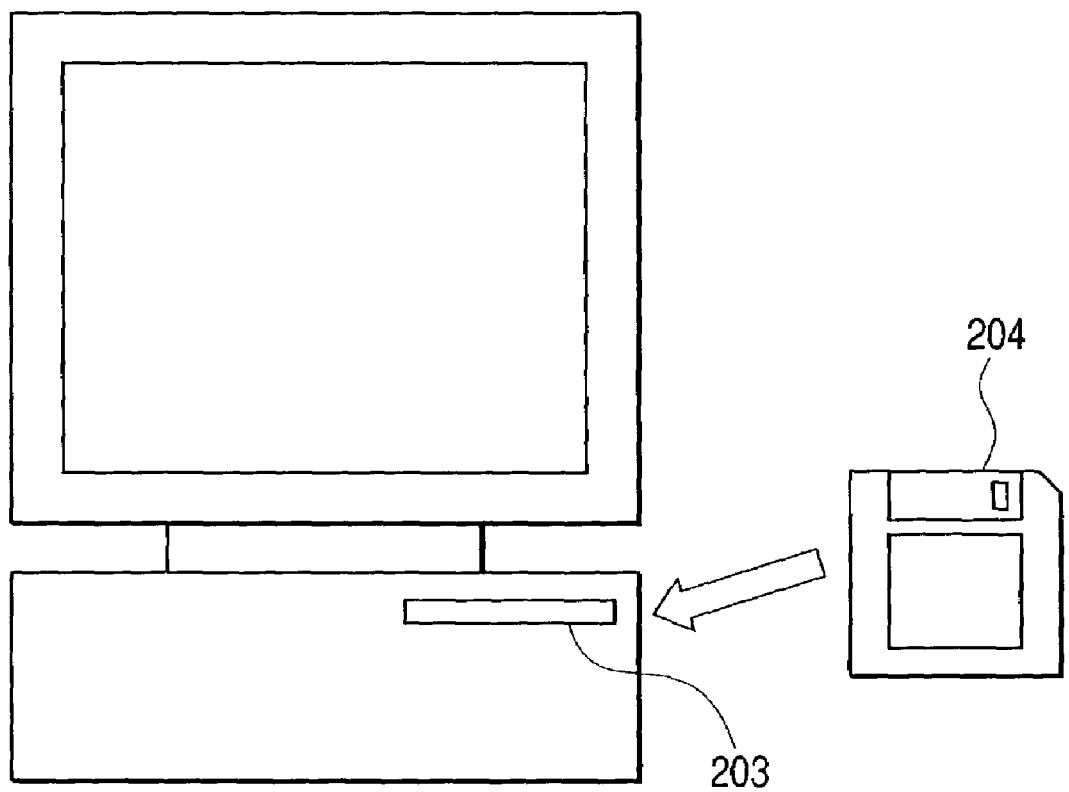
FIG. 3 is an explanatory diagram conceptually showing how programs are supplied from an FD to a server or client PC according to the embodiment.

The FD drive 203 is built into a computer or the like as shown in FIG. 3 and allows print system programs including this print client program stored on the FD 204 to be loaded into this computer system. The content of the FD 204 can be installed on storage means such as the HD 205.

Figure 4:
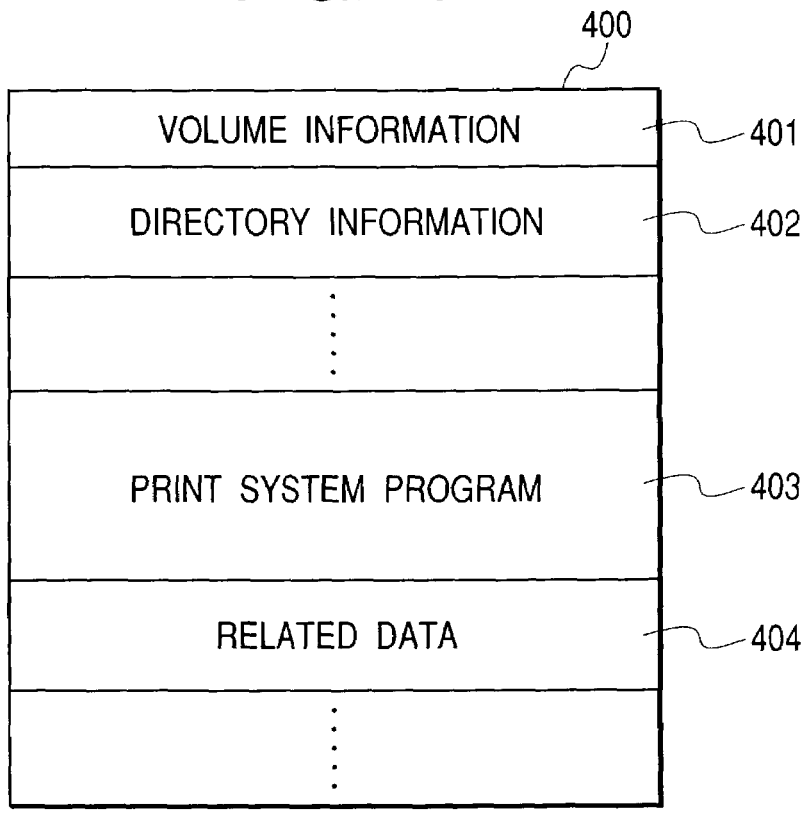
FIG. 4 is an explanatory diagram showing data contained in an FD for a server and client PC according to this embodiment.

The structure of the content stored on the FD is shown in FIG. 4. In the figure, reference numeral 400 denotes the data content on the FD 204, reference numeral 401 denotes volume information which represents configuration of data, reference numeral 402 denotes directory information, reference numeral 403 denotes the print system programs described in this embodiment. These programs have been coded according to sequence diagrams shown in FIGS. 10 and 11 and flowcharts shown in FIGS. 12 to 15, 18, 21, and 22. Reference numeral 404 denotes their related data.

The HD 205 stores the OS, print application programs, the print client program, etc. The keyboard 206 allows the user to enter device control commands and other commands in the print client PCs 103 and 104. The display 207 displays the commands entered on the keyboard 206, print status, etc. The system bus 208 manages flows of data in the print client PCs 103 and 104.

According to this embodiment, the print system programs and related data are loaded directly from the FD 204 into the RAM 202 for execution, but they may alternatively be loaded from the HD 205 into the RAM 202 each time the print system programs are operated from the FD 204.

Besides, instead of the FD, the print system programs may be stored on another medium such as a CD-ROM, IC memory card, or the like. Furthermore, it is also possible to store the print system programs on the ROM 201, configure them as part of a memory map, and execute them directly by the CPU 200.

Figure 5:
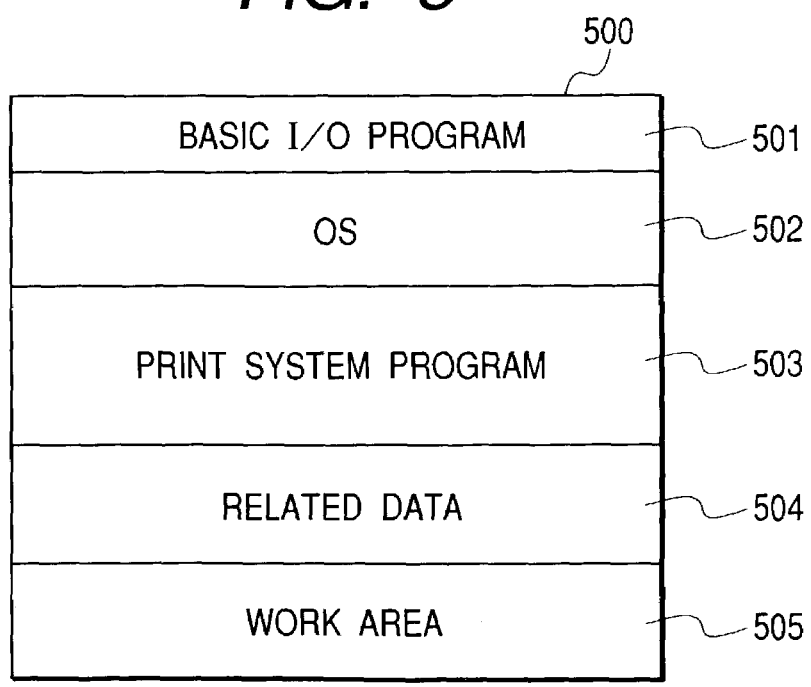
FIG. 5 is an explanatory diagram showing a memory map obtained when the programs are loaded from the FD into a RAM of the server and client PC according to this embodiment.

FIG. 5 is a diagram showing a memory map obtained when he print system programs are loaded into the RAM 202 and ready to be executed.

Reference numeral 501 denotes an area for the basic I/O program, which has the IPL (Initial Program Loading) function of reading the OS into the RAM 202 from the HD 205 and starting it when the controller is turned on. Reference numeral 502 denotes an area for the OS, 503 denotes an area for the print system programs, and 504 denotes an area for the related programs. Reference numeral 505 denotes a work area where the CPU 200 runs the print system programs.

[Schematic Configuration of Printer]

Figure 6:
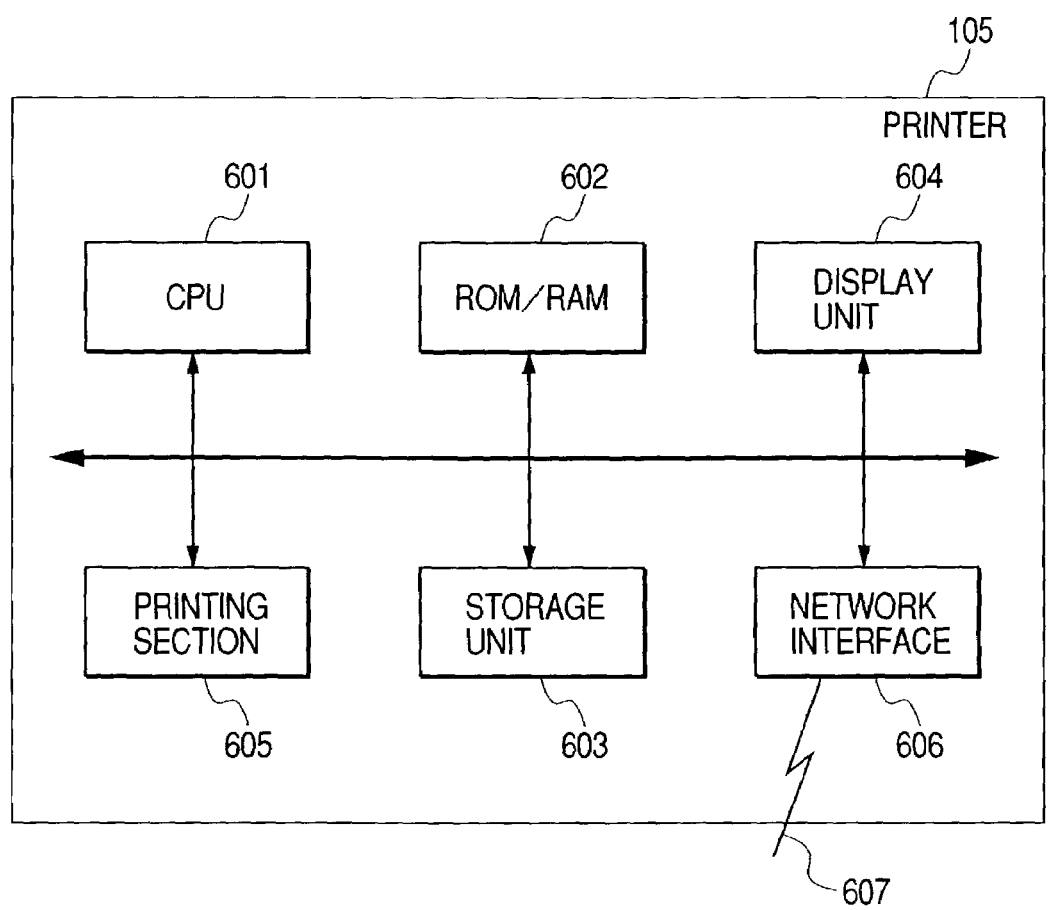
FIG. 6 is a block diagram showing a schematic configuration of a printer according to the embodiment.

FIG. 6 is a block diagram showing a schematic configuration of the printer 105 according to the embodiment of the present invention.

The printer 105 according to this embodiment comprises a CPU 601, ROM/RAM 602, storage unit 603, display unit 604, printing section 605, network interface 606, and a communications line 607.

Referring now in detail to configurations of the above components, the CPU 601 controls the entire printer. The ROM/RAM 602 includes a buffer which temporarily stores a control program and constant data for controlling the CPU 601 as well as transmit and receive data. The storage unit 603, which is a storage means such as a hard disk, stores transmitted and received data, the control program executed by the CPU 601, and data.

The display unit 604 displays data temporarily stored in ROM/RAM 602, data content stored in the storage unit 603, operating status, etc. The printing section 605 prints out dot data generated by the CPU 601, based on the program stored in ROM/RAM 602. The network interface 606 is used to transfer print data and the like to/from external devices such as print server PCs. The communications line 607 connects the network interface 606 with the network 106.

[Software Module Configurations for Client PC and Server PC]

Figure 7:
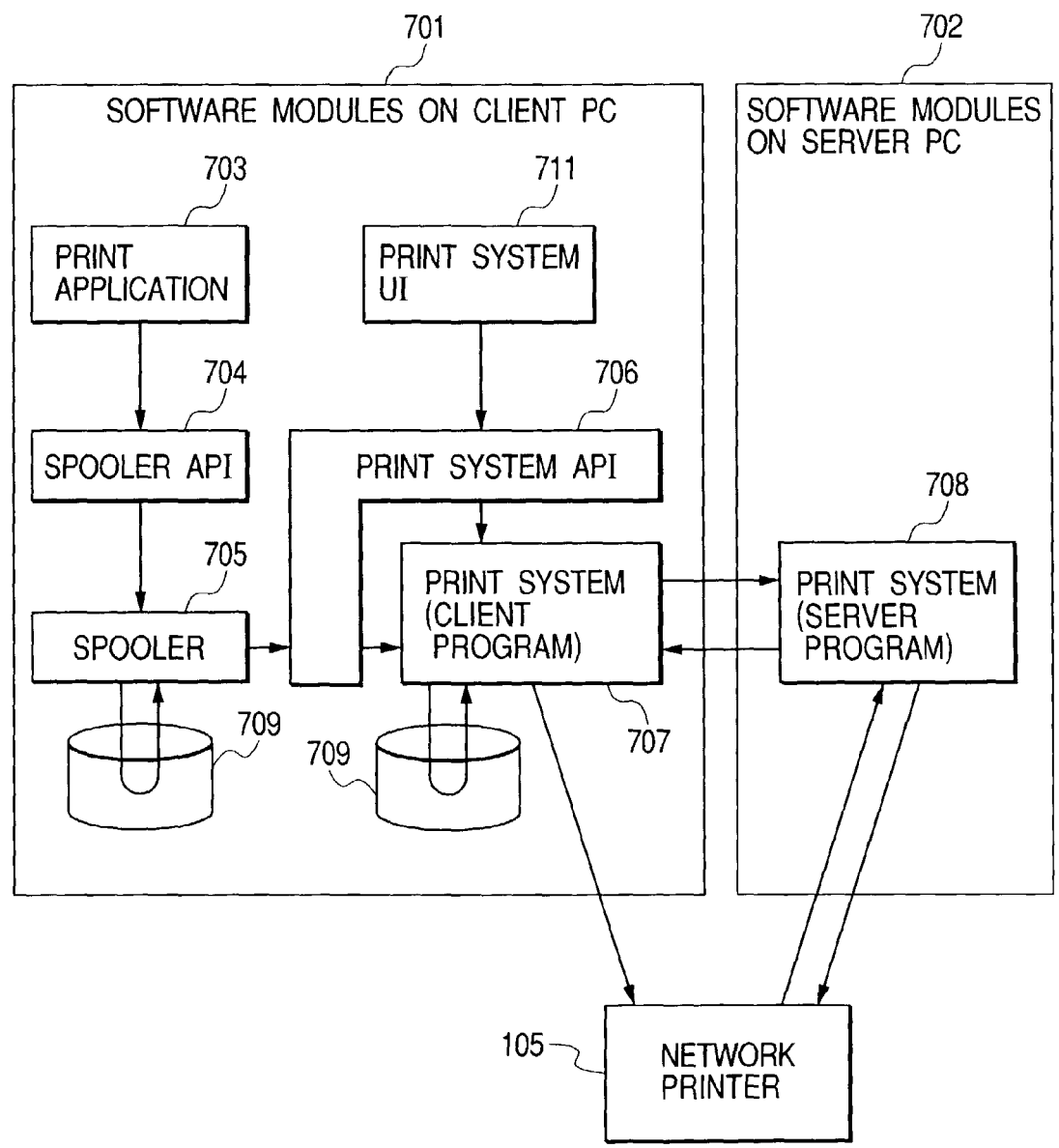
FIG. 7 is a diagram showing software module configurations for the client PC and server PC according to the embodiment.

FIG. 7 is a diagram showing software module configurations for the client PC and server PC in the information processing system according to this embodiment.

Reference numeral 701 denotes a software module configuration for the client PC and 702 denotes a software module configuration for the server PC. Reference numeral 703 denotes a print application, 705 denotes a spooler provided by the OS, and 704 denotes a spooler API (Application Programming Interface) which provides an interface to the spooler. Reference numeral 707 denotes a client program (hereinafter referred to as the client-side print system) of the print system, 706 denotes a print system API which provides an interface to the print system, and 708 denotes a server program of the print system (hereinafter referred to as the server-side print system). Reference numeral 709 denotes an HD for storing a spool file.

The print application 703 outputs print data to the spooler 705 using the spooler API 704 provided by the OS (here, control codes may be embedded in the print data using the spooler API 704). The primary role of the spooler 705 is to spool print data on the HD 709 and then transmit it to the printer in sequence after scheduling. In this configuration, however, the spooler 705 passes the print data to the client-side print system 707 via the print system API 706 instead of transmitting it to the printer.

Figure 8:
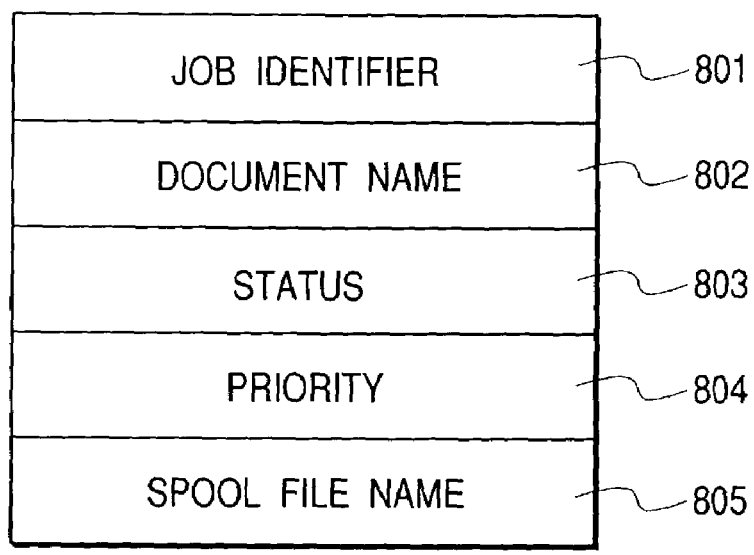
FIG. 8 is an explanatory diagram showing print job information according to the embodiment.

The client-side print system 707 spools the print data received from the spooler 705 on the HD 709 while registering print jobs with the server-side print system 708 (FIG. 8). The server-side print system 708 schedules the print jobs received from the client-side print system 707 and instructs the client-side print system 707 to start printing in sequence. Upon being instructed by the server-side print system 708 to start printing, the client-side print system 707 transmits the print data to the network printer 105.

The client-side print system 707 normally registers client information with the server-side print system 708 at start-up and the server-side print system 708 notifies the client-side print system 707 about changes in printer status and completion of a print job (paper ejection complete) based on the registered client information. By changing server connection mode, the client-side print system 707 can maintain connection with the server-side print system 708 only between the time when a print job is input and the time when printing is complete instead of connecting to the server-side print system 708 at start-up. In that case, the period between the time when printing is complete and the time when the connection with the server-side print system 708 is released can be specified with some leeway. In the case of continuous printing or the like, the client-side print system 707 is disconnected from the server-side print system 708 after the all print jobs are complete.

The server-side print system 708 constantly polls the network printer 105, acquires its status as well as the job identifier of any completed print job, and informs the client-side print system 707. A job identifier is received from the server-side print system 708 by the client-side print system 707 when a print job is registered with the server-side print system 708, and it is embedded in print data when the print data is transmitted to the network printer 105. The network printer 105 saves the job identifier embedded in the print data when printing is completed.

[Configuration of Print Job Information]

FIG. 8 is a diagram showing structure of print job information prepared by the client-side print system 707 when it receives print data from the spooler 705.

As shown in the figure, the print job information includes the following information. Reference numeral 801 denotes a job identifier issued by the server-side print system 708, reference numeral 802 denotes a document name, reference numeral 803 denotes status, reference numeral 804 denotes priority, and reference numeral 805 denotes a spool file name.

The print job information is added to a print job information list in the client-side print system 707. Also, print job information is prepared similarly by the server-side print system 708 when the client-side print system 707 registers job information with the server-side print system 708. Besides, the print job information also contains information (not shown) needed to associate itself with client information described later.

[Configuration of Client Information]

Figure 9:
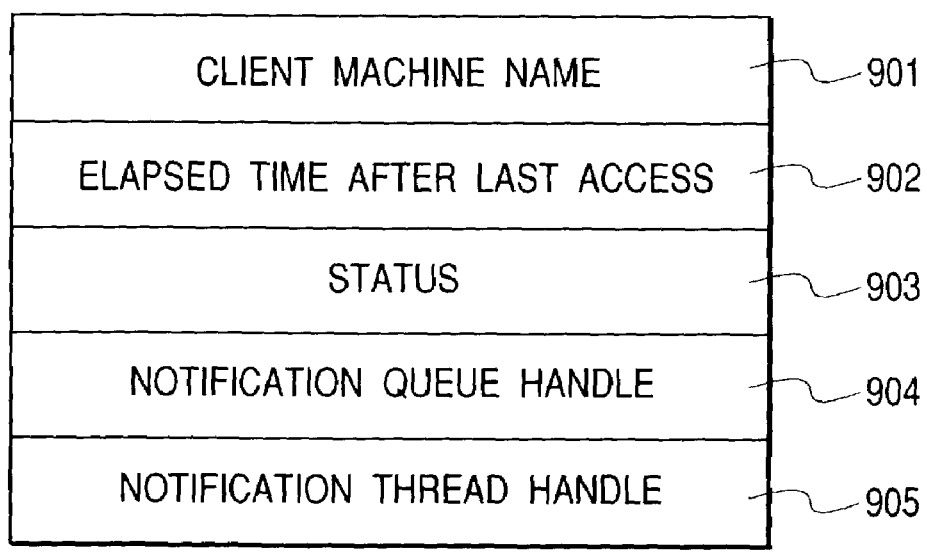
FIG. 9 is an explanatory diagram showing client information according to the embodiment.

FIG. 9 is a diagram showing structure of client information held by the server-side print system 708.

Client information is prepared in response to a registration request from the client-side print system 707, and deleted in response to a deletion request. As shown in FIG. 9, the client information includes the following information. In the figure, reference numeral 901 denotes a client machine name (information capable of identifying a client and used for an RPC—remote procedure call; or an IP address itself assigned to the client may be used), 902 denotes elapsed time after the last access from the client, 903 denotes status, 904 denotes a queue handle for queuing a notification to the client (notification queue handle), and 905 denotes a thread handle for notification (notification thread handle).

The client machine name 901 is a piece of identification information for identifying a given client from among multiple clients registered with the server and corresponds to a computer name or the like. The elapsed time after the last access 902 is used to delete the client information assuming that the client has encountered power-off or some other trouble if it is confirmed that the client has not accessed the server for a long time. The status 903 indicates status which can exist when the client is connected to the server, such as Initializing or Initialized, or printer status. The notification queue handle 904 is a pointer to a notification queue (a queue for temporarily storing information related to notification) assigned to the client registered with the server. The notification thread handle 905 is a piece of identification information which specifies a program (routine) used by the server when sending notification to the client.

[Overall Process in Print System]

Next, an overall flow of processes performed by the print system according to this embodiment will be described with reference to sequence diagrams in FIGS. 10 and 11.

Figure 10:
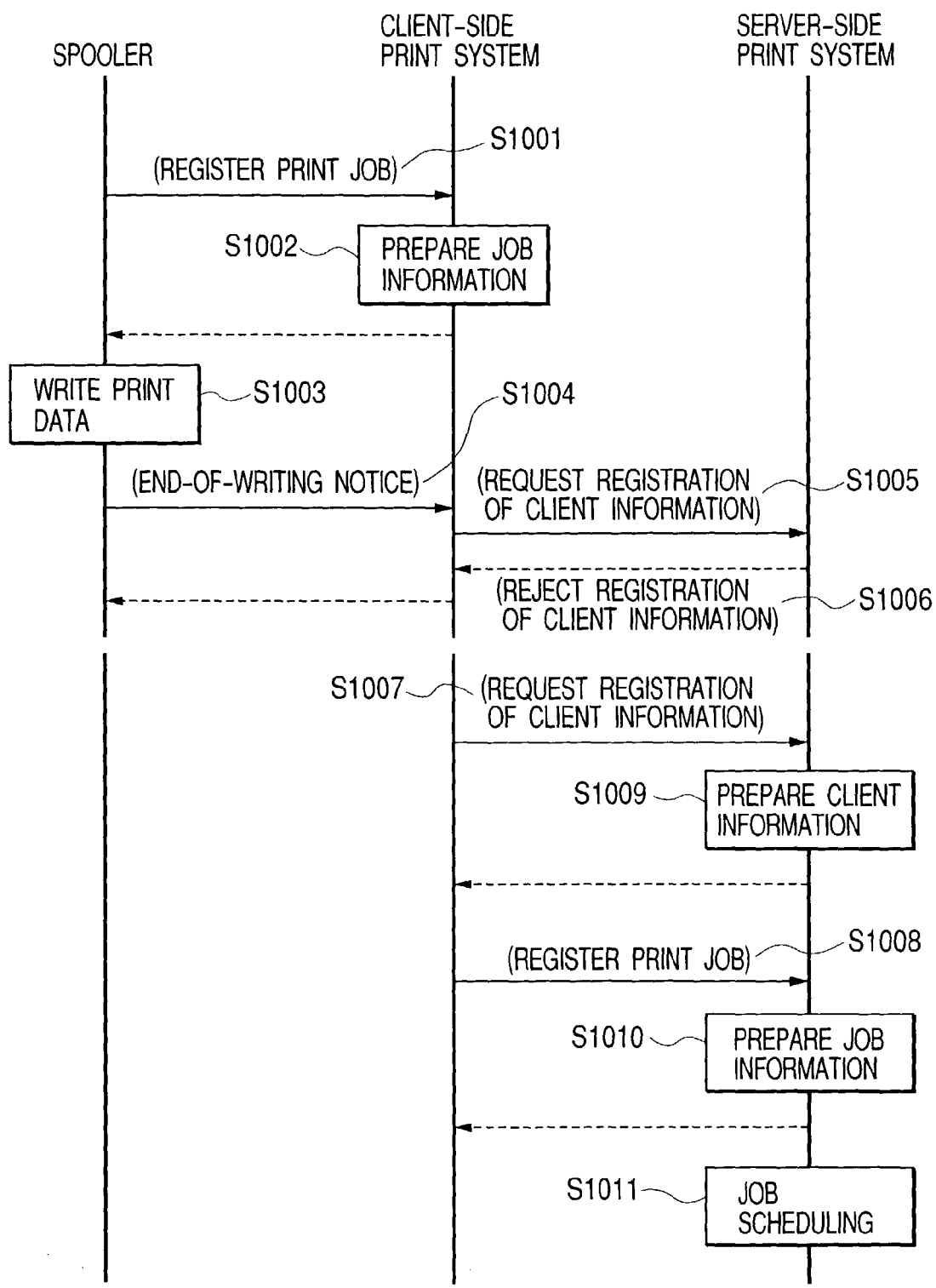
FIG. 10 is a sequence diagram showing processes up to a scheduling process in the print system according to the embodiment.

FIG. 10 is a sequence diagram showing processes up to a scheduling process in the print system according to this embodiment. The process of each step in FIG. 10 is implemented when a CPU mounted in the device in charge of the process reads and executes program code for running the process.

When a print instruction is given via the print application 703 based on an instruction entered by the user, a print job (including print data and job information) is generated in the spooler 705, stored temporarily in the spooler 705, and registered with the client-side print system 707 (Step S1001). Then, the client-side print system 707 prepares print job information (FIG. 8) (Step S1002). The spooler 705 writes the print data to a file (on 709) (Step S1003) and notifies the client-side print system 707 about the end of writing (Step S1004).

The client-side print system 707 performs a connection process (registration of client information) for connecting with the server-side print system 708 (Step S1005). At this time, if the number of clients connected to the server-side print system 708 exceeds the maximum number of client connections, the server-side print system 708 rejects connection (Step S1006). Specifically, in response to the request for registration of client information made in Step S1005, the server-side print system 708 judges whether the maximum number of clients is exceeded. If it is exceeded, the server-side print system 708 runs the process of Step S1006. The upper limit of clients is specified in the server-side print system 708 via a user interface in FIG. 17 described later.

If the client-side print system 707 has been refused connection, it retries requesting the server-side print system 708 periodically to allow connection (Step S1007). When connection (registration of client information) is allowed, it registers print jobs (Step S1008). Meanwhile, the server-side print system 708 prepares client information (Step S1009) and then it prepares job information about the print jobs registered by the client-side print system 707 (Step S1010) and schedules the jobs (Step S1011).

Figure 11:
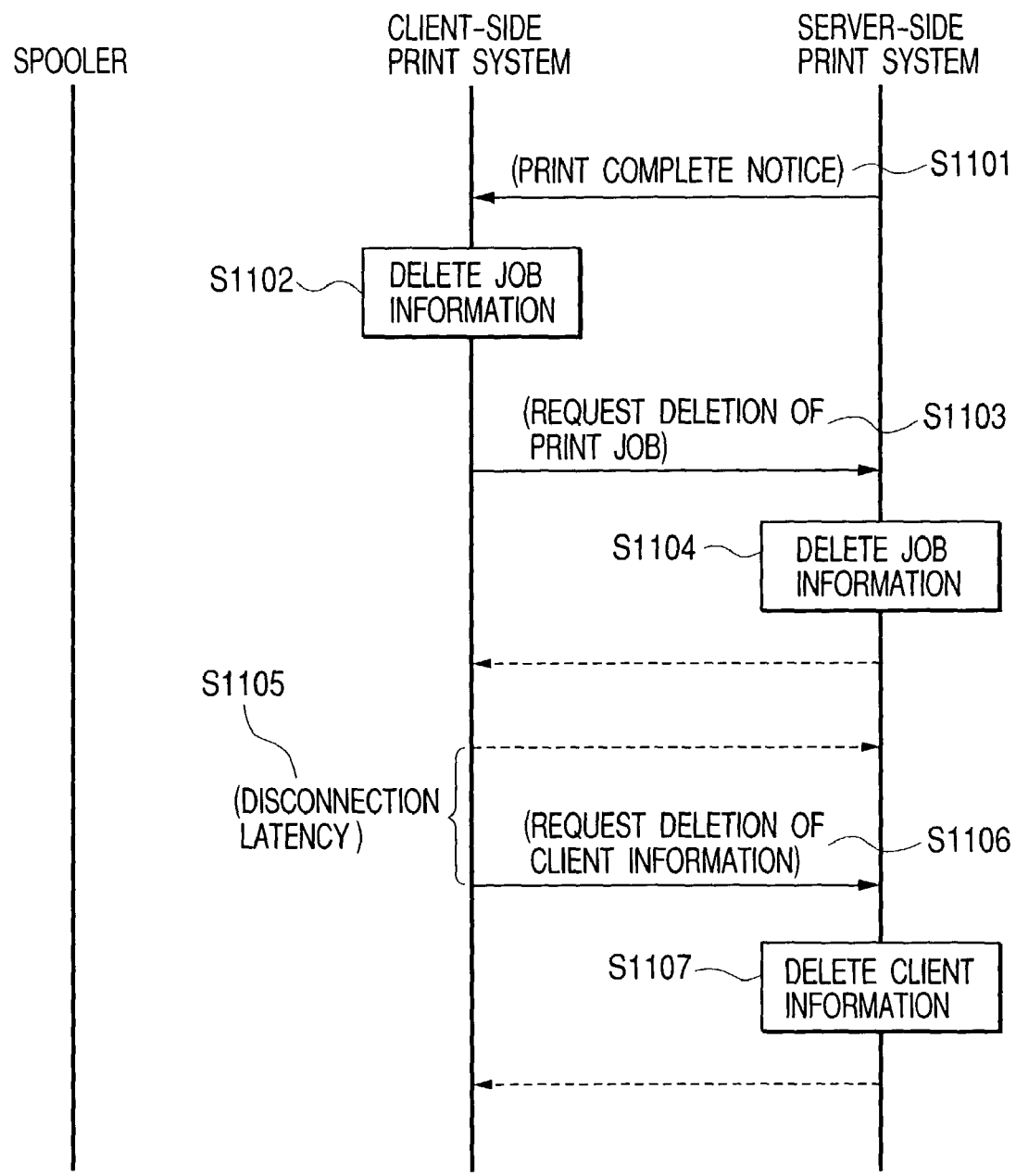
FIG. 11 is a sequence diagram showing processes up to a connection release process in the print system according to the embodiment.

FIG. 11 is a sequence diagram showing processes up to a connection release process in the print system according to this embodiment: processes performed from the time when the client-side print system 707 transmits print data to the network printer 105 until it receives a Printing Complete notice from the server-side print system 708 and releases the connection with the server-side print system 708 (deletes the client information). The process of each step in FIG. 11 is implemented when a CPU mounted in the device in charge of the process reads and executes program code for running the process.

Upon receiving the Printing Complete notice from the server-side print system 708 (Step S1101), the client-side print system 707 deletes the job information (Step S1102) and requests the server-side print system 708 to delete the job information (Step S1103). In response, the server-side print system 708 deletes the job information (Step S1104). Then, when a specified disconnection latency elapses (Step S1105), the client-side print system 707 releases the connection with the server-side print system 708 (requests deletion of the client information) (Step S1106). In response, the server-side print system 708 deletes the client information (Step S1107). According to the processes described with reference to the flowchart in FIG. 11, the job information (FIG. 8) and client information (FIG. 9) can be deleted at the right time. This makes it possible to eliminate unnecessary connections (clients) to the server.

Now, the process of Step S1104 will be described in more detail. It has been described above that the client information is deleted when a specified disconnection latency (1606 in FIG. 16) elapses after the job information is deleted.

Actually, however, before running the process of Step S1104, the server-side print system 708 carries out a search process and judgment process to check for any other registered job information associated with the client information registered with itself.

If it is judged that there is other registered job information associated with the client information which corresponds to the job information deleted in Step S1104, the server-side print system 708 exercises control so as not to release the connection even after the "time until server connection is released" in FIG. 16 (described later) elapses. This is done to avoid a situation in which the connection would be released and the client would have to be registered anew.

Description will be given here about a case in which there is other registered job information associated with the client information which corresponds to the job information deleted in Step S1104. For example, suppose the same user (Client A) gives instructions to print two or more application files, respective job information is generated in Steps S1001 and S1002 of FIG. 11, and the server-side print system 708 is notified of it. Then, multiple items of job information corresponding to the client information are managed by the print system.

The server-side print system 708 which limits registrations of client information comprises means for registering client information which corresponds to a given client; means for registering multiple items of client information for the client; means for deleting the client information a designated time after completion of job processing; and control means for performing control so as not to delete the client information a designated time after job processing associated with the job information is completed if there is other job information associated with the client information, i.e., means for releasing the connection between the client and the server-side print system 708. Consequently, if the same user (client) wants to print other print data after one print job is completed (the job information is deleted in Step S1104), the new print data can be printed successively without the need to register client information anew, provided the "time until server connection is released" has not elapsed. In the case of successive printing, the client information is not deleted even if the "time until server connection is released" (1606) elapses after the first job processing is completed, making it possible to avoid redundant registration of the client information.

In this way, since this embodiment can set a client PC to be connected to the server PC only during printing and set an upper limit on the number of clients registered with the server PC, client PCs can be registered with the server PC more flexibly. Consequently, a large number of client PCs can request the server PC to allow connection while the server PC does not accept user registration corresponding to or in excess of the limit value. This makes it possible to keep processing loads below a certain level. In other words, since control is performed in such a way as to allow a client PC to be connected to the server PC only during printing and simultaneously set an upper limit on the number of connections (clients) to the server PC, it is possible to allow more clients (in excess of the upper limit) to use the server PC than when simply an upper limit is set on the number of connections (clients) to the server PC. Furthermore, the load on the server can be kept below a certain level even though more users are allowed to use the server.

[Process Details of Print System]

Of the overall flow of the print system processes described above with reference to FIGS. 10 and 11, processes characteristic to the present invention will be described in detail below with reference to flowcharts in FIGS. 12 to 15. The process of each step in FIGS. 12 to 15 is implemented when a CPU mounted in the device in charge of the process reads and executes program code for running the process, as is the case with FIGS. 10 and 11.

<Processes Subsequent to Receipt of End-of-Writing Notice (Client-Side): S1004 and Subsequent Processes in FIG. 10>

Figure 12:
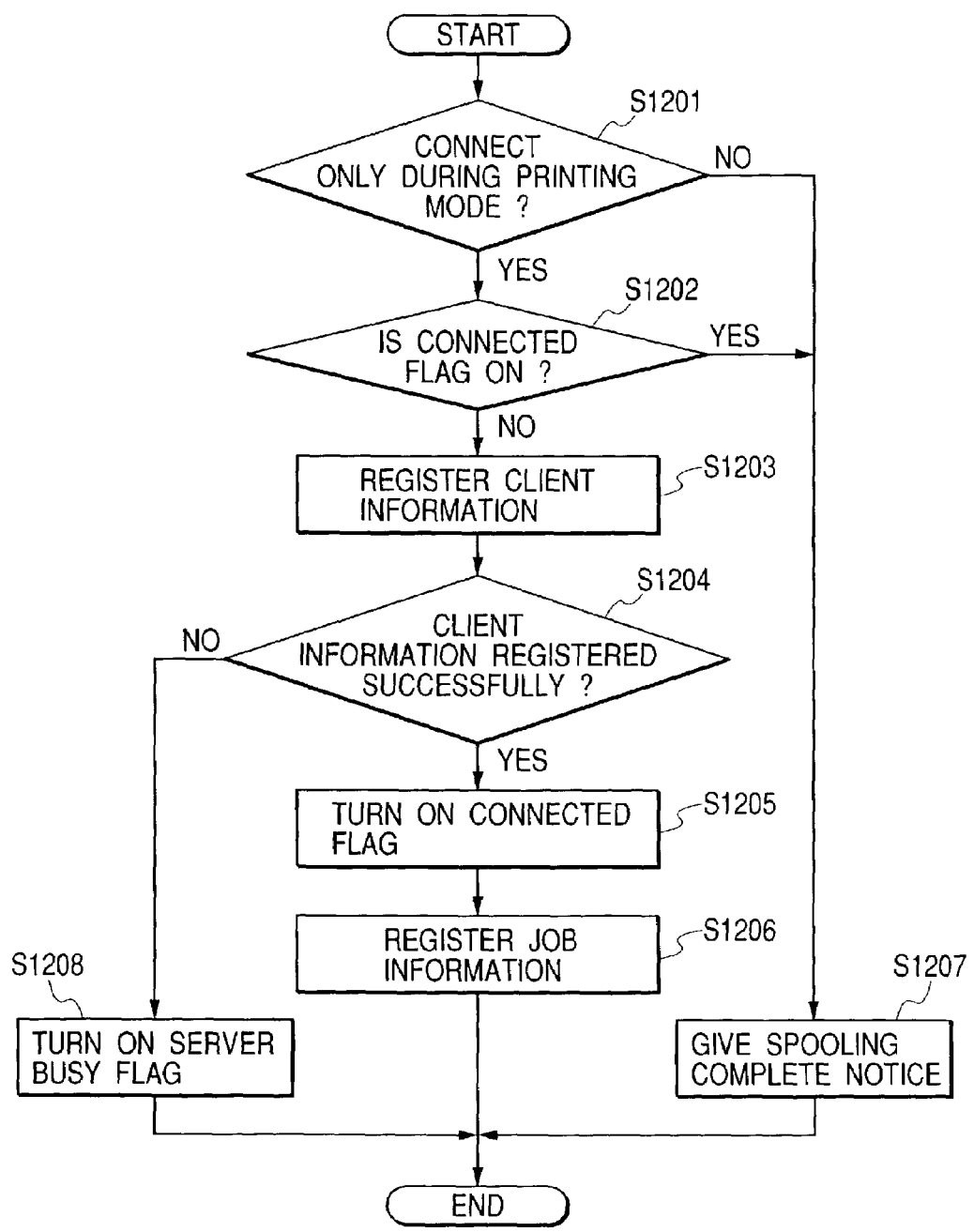
FIG. 12 is a flowchart showing a flow of processes performed by a client-side print system according to the embodiment upon being notified by a spooler about the end of writing of print data.

FIG. 12 is a flowchart showing a flow of processes performed by the client-side print system 707 upon being notified by the spooler 705 about the end of writing of print data (or when reprinting is specified for an abnormally terminated print job).

In Step S1201, the client-side print system 707 judges whether the server connection mode is "connect only during printing." If it is judged that the current mode is not "connect only during printing" (i.e., the mode is "always connect"), the client-side print system 707 notifies the server-side print system 708 about completion of spooling of the print data in Step S1207 and finishes processing.

In Step S1201 above, it is judged whether the connection mode is "connect only during printing," but whether to check for the "connect only during printing" mode or "always connect" mode depends on a default setting stored in the client-side print system 707. This setting is configured when the client-side print system 707 is installed, or later on a Properties screen (FIG. 17; described later) brought up upon password login to the client on which the client-side print system 707 has been installed. The setting—"connect only during printing" or "always connect"—specified in this way can be changed later by the client (each machine). This makes it possible to configure settings according to the needs of the user, for example, to treat users who greatly need printed matter and other users differently.

In Step S1202, the client-side print system 707 judges whether a Connected flag is ON indicating a state of connection with the server-side print system 708. The client keeps the Connected flag in the ON state while the client 701 is connected with the server PC 702.

If it is judged in Step S1202 that the Connected flag is ON (i.e., the "time until server connection is released" in FIG. 16 has not elapsed after establishment of connection with the server and the connection is still maintained), the client-side print system 707 notifies the server-side print system 708 about completion of spooling of the print data in Step S1207 and finishes processing.

If it is judged in Step S1202 that the Connected flag is OFF, the client-side print system 707 registers client information with the server-side print system 708 in Step S1203 and judges in Step S1204 whether the client information has been registered successfully. If the registration is successful, the client-side print system 707 turns on the Connected flag in Step S1205, registers job information with the server-side print system 708 in Step S1206, and finishes processing.

If registration of the client information fails in Step S1204, the client-side print system 707 turns on a Server Busy flag in Step S1208 and finishes processing. The success in the registration of the client information here is based on information held by the client after the client is notified by the server that registration of the client information is rejected in Step S1006 of FIG. 10 (described above).

<Retry of Connection Request (Client-Side): S1007 in FIG. 10>

Figure 13:
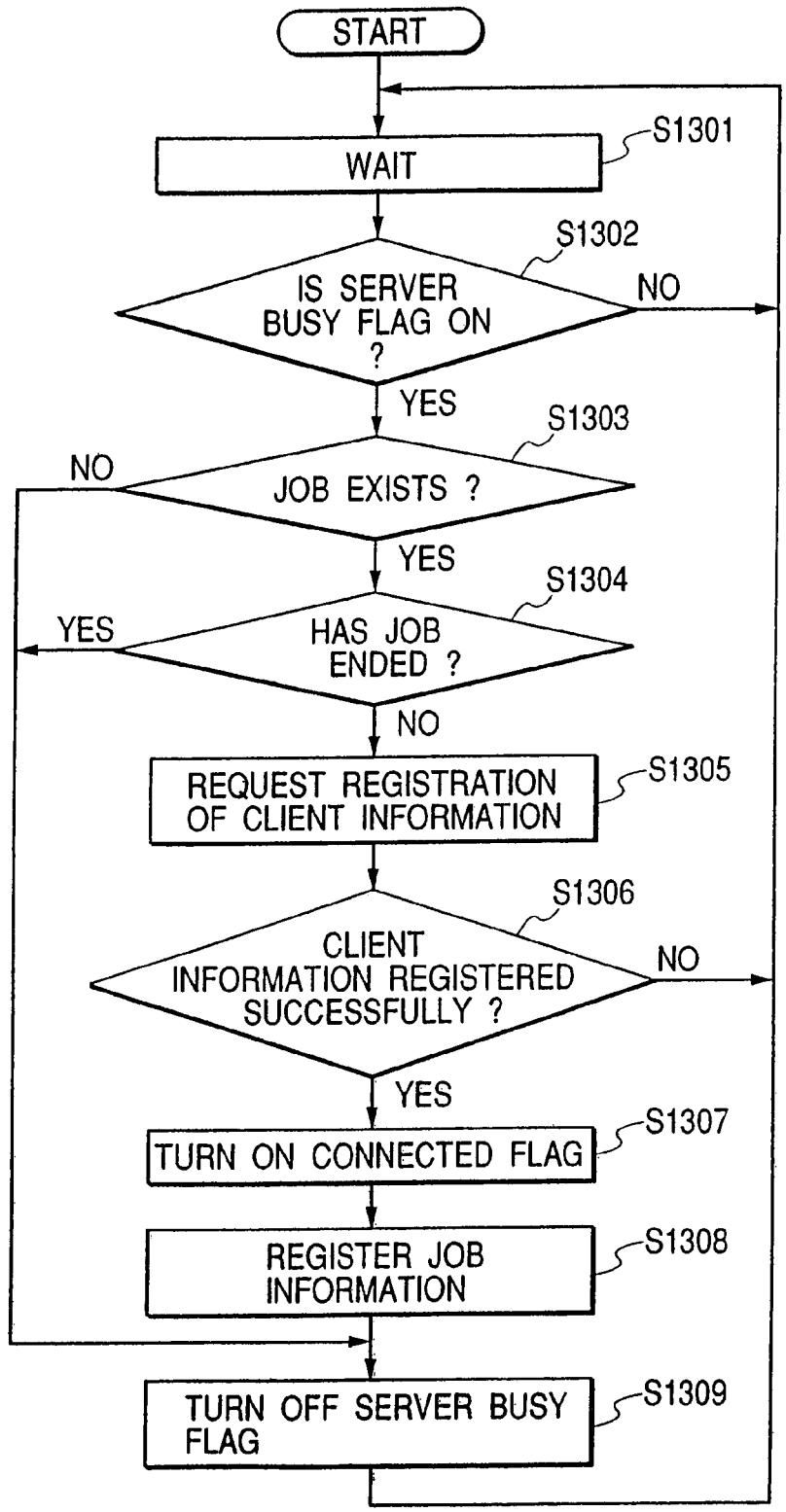
FIG. 13 is a flowchart showing processes performed by the client side according to the embodiment when retrying a connection request.

FIG. 13 is a flowchart showing a flow of processes performed by a resident thread to retry a connection request when the client-side print system 707 is rejected connection by the server-side print system 708.

Figure 16:
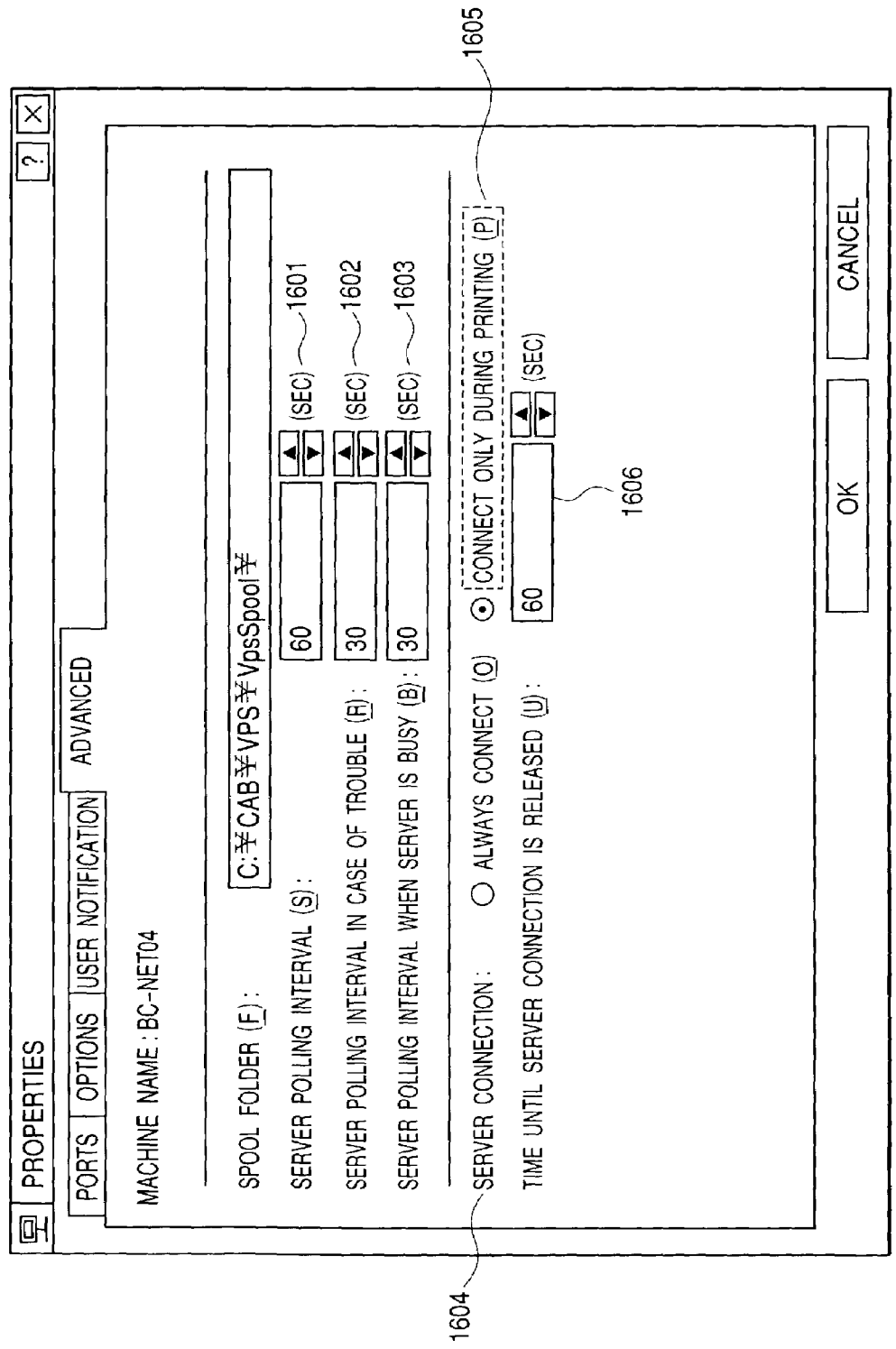
FIG. 16 is a diagram showing a display screen used to make settings such as server mode switching according to the embodiment.

After waiting for a certain time (which corresponds to "server polling interval when server is busy" 1603 in FIG. 16) in Step S1301, the client-side print system 707 judges in Step S1302 whether the Server Busy flag is ON. If it is judged that the Server Busy flag is OFF, the client-side print system 707 returns to Step S1301. If it is judged in Step S1302 that the Server Busy flag is ON, the client-side print system 707 judges in Step S1303 whether there is a job (on 709) on the local machine. If it is judged in Step S1303 that there is no job, the client-side print system 707 turns off the Server Busy flag in Step S1309 and returns to Step S1301.

If it is judged in Step S1303 that there is a job, the client-side print system 707 judges in Step S1304 whether the job has terminated abnormally. For example, a job will terminate abnormally if it cannot be transmitted because something is wrong with the communications functions of the client. Thus, jobs which will prevent scheduling of print jobs for multiple clients will be excluded from controlled objects. If it is judged in Step S1304 that the job has terminated abnormally, the client-side print system 707 turns off the Server Busy flag in Step S1309 and returns to Step S1301. If it is judged in Step S1304 that the job has not terminated abnormally, the client-side print system 707 requests the server-side print system 708 in Step S1305 to register the client information.

In Step S1306, the client-side print system 707 judges whether the client information has been registered successfully. If it is judged that registration of the client information has been rejected by the server-side print system 708, the client-side print system 707 returns to Step S1301. If it is judged in Step S1306 that registration of the client information has been permitted by the server-side print system 708, the client-side print system 707 turns on the Connected flag in Step S1307 and goes to Step S1308. The client-side print system 707 registers job information with the server-side print system 708 in Step S1308, turns off the Server Busy flag in Step S1309, and returns to Step S1301.

<Processes in Response to Connection Request (Server Side): S1005 in FIG. 10>

Figure 14:
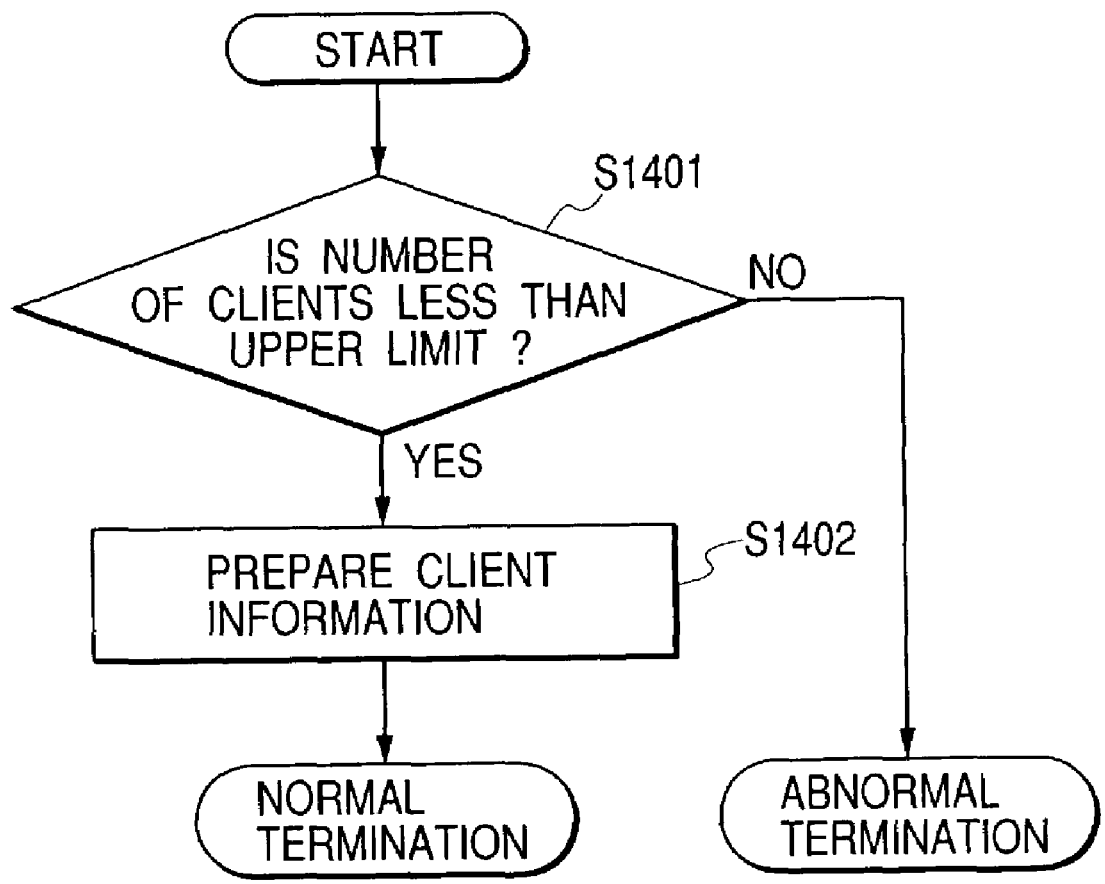
FIG. 14 is a flowchart showing processes performed by the server side according to the embodiment when a connection request is received.

FIG. 14 is a flowchart showing a flow of processes performed by the server-side print system 708 when a connection request is received.

Upon receiving a request for registration of client information from the client-side print system 707, the server-side print system 708 counts the number of items of client information currently in its possession and judges in Step S1401 whether it is less than the user-specified upper limit of connected clients.

If it is judged in Step S1401 that the number of connected clients is not less than the upper limit (the setting in 1705 in FIG. 17), the server-side print system 708 returns a Server Busy error to the client-side print system 707 and rejects registration of the client information. If it is judged in Step S1401 that the number of connected clients is less than the upper limit, the server-side print system 708 prepares client information in Step S1402 and finishes processing.

<Disconnection from Server (Client-Side): S1106 in FIG. 11>

Figure 15:
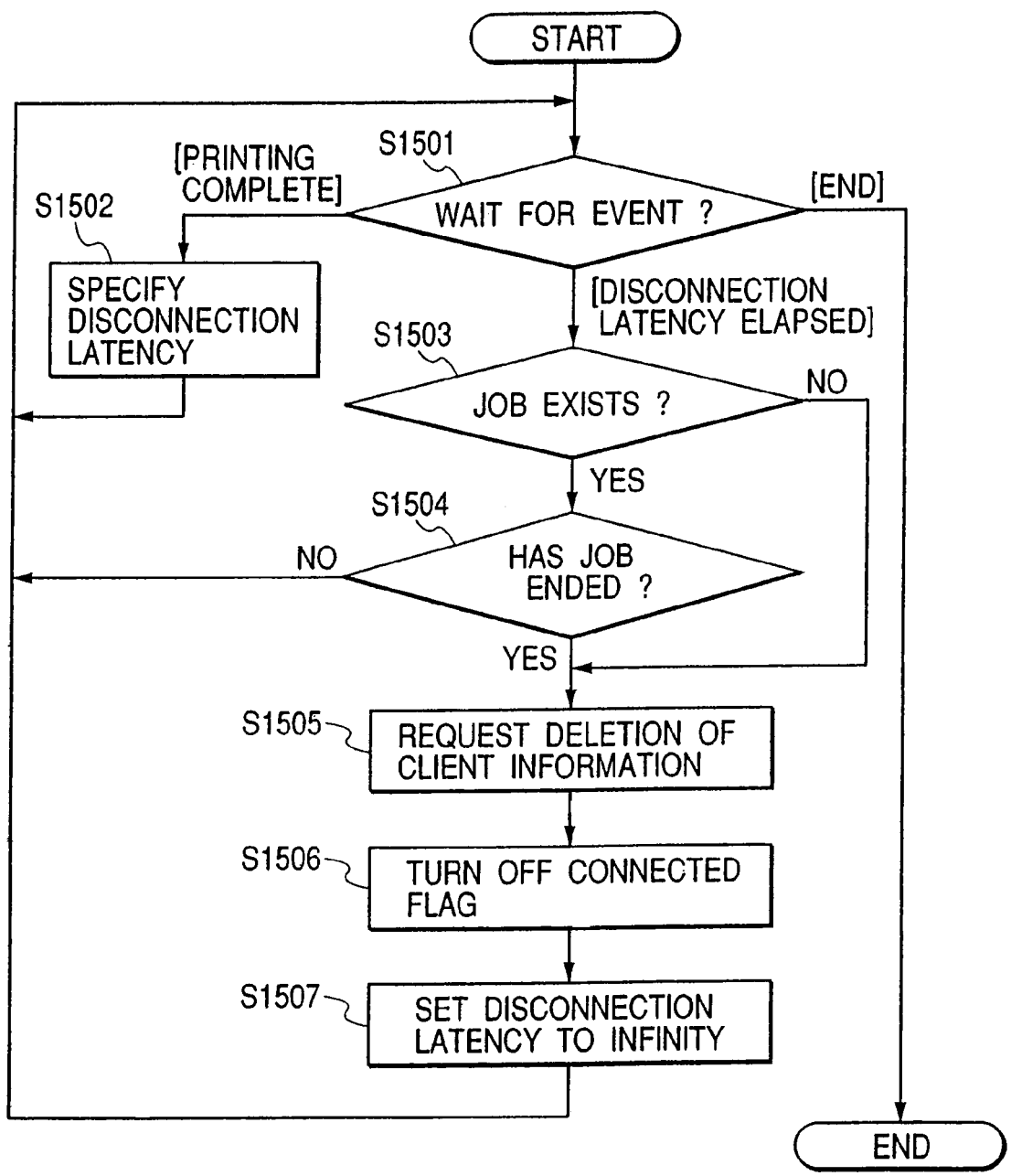
FIG. 15 is a flowchart showing the process (on the client side) of releasing a connection with the server according to the embodiment.

FIG. 15 is a flowchart showing a flow of processes performed by a thread when the client-side print system 707 releases connection with the server-side print system 708 after a disconnection latency, wherein the thread is generated in the "connect only during printing" mode.

In Step S1501, the client-side print system 707 waits until any of the following events occurs: a Printing Complete event issued when a Printing Complete notice is received from the server-side print system 708, Disconnection Latency Elapsed event issued when a disconnection latency elapses, and End event issued when the client-side print system 707 terminates. When an end event occurs, the thread is terminated. If a Printing Complete event occurs, the client-side print system 707 sets the connection latency to user-specified time in Step S1502, returns to Step S1501, and waits there.

If a Disconnection Latency Elapsed event occurs in Step S1501, the client-side print system 707 goes to Step S1503 and judges whether there is a print job on the local machine. If it is judged that there is no job, the client-side print system 707 goes to Step S1505. If it is judged in Step S1503 that there is a print job, the client-side print system 707 goes to Step S1504 and judges whether the job is remaining after an abnormal termination. If the job did not terminate abnormally, the client-side print system 707 returns to Step S1501 and waits there.

If it is judged in Step S1504 that the job is remaining after an abnormal termination, the client-side print system 707 goes to Step S1505 and requests the server-side print system 708 to delete the client information (disconnection process). Then, client-side print system 707 turns off the Connected flag in Step S1506, sets the disconnection latency to infinity in Step S1507, returns to Step S1501, and waits there.

<Examples of Display Screens Characteristic of the Present Invention>

Figure 17:
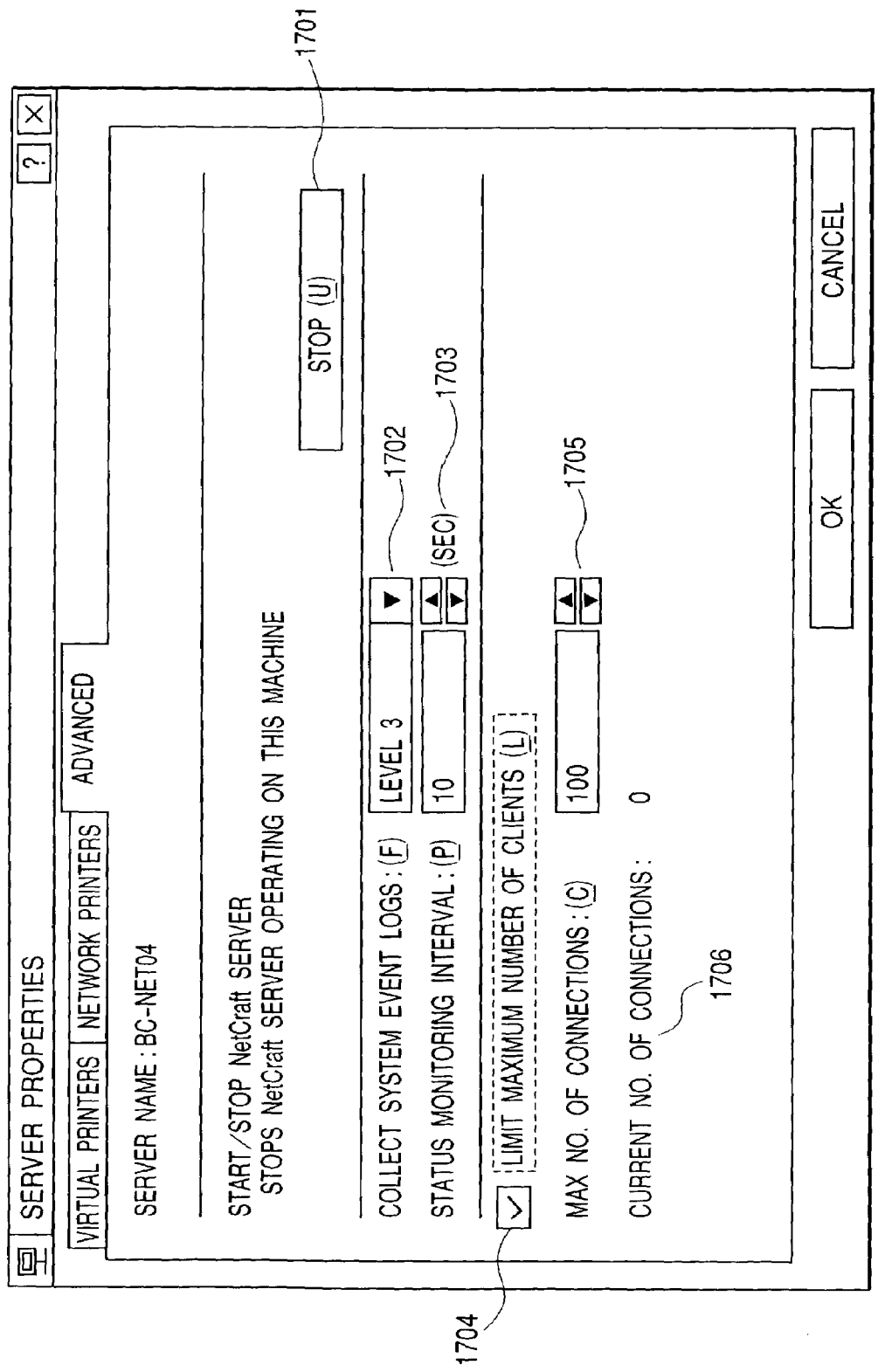
FIG. 17 is a diagram showing a display screen used to set the maximum number of clients accepted by the server according to the embodiment.

A print system UI screen for use by the user to switch the server connection mode (1604 and 1605) and set the disconnection latency (1606) is shown in FIG. 16. Besides, a screen of a print system UI 711 for use by the user to set the maximum number of clients accepted by the server-side print system 708 upon connection request is shown in FIG. 17. These UI screens are displayed based on UI information stored in an information processing apparatus which displays the UIs. The screen in FIG. 17 also indicates the current number of connections (1706), which is updated, as required, based on the number of items of user information registered with the system. Checking 1704 enables the maximum number of connections specified in 1705. Any number may be specified in 1705 and by specifying an appropriate number according to the number of users or frequency of user access, it is possible to reduce server load appropriately.

The screens in FIGS. 16 and 17 can be displayed on the client PC 701 and server PC 702. Whether or not individual fields are configurable (enabled/disabled) can be specified using an administrator password.

Second Embodiment

A second embodiment relates to advanced versions of the server and connection release process (FIG. 15) according to the first embodiment described above. Incidentally, configurations and functions of individual devices in the second embodiment are the same as those of the first embodiment described at least with reference to FIGS. 1 to 9.

Figure 18:
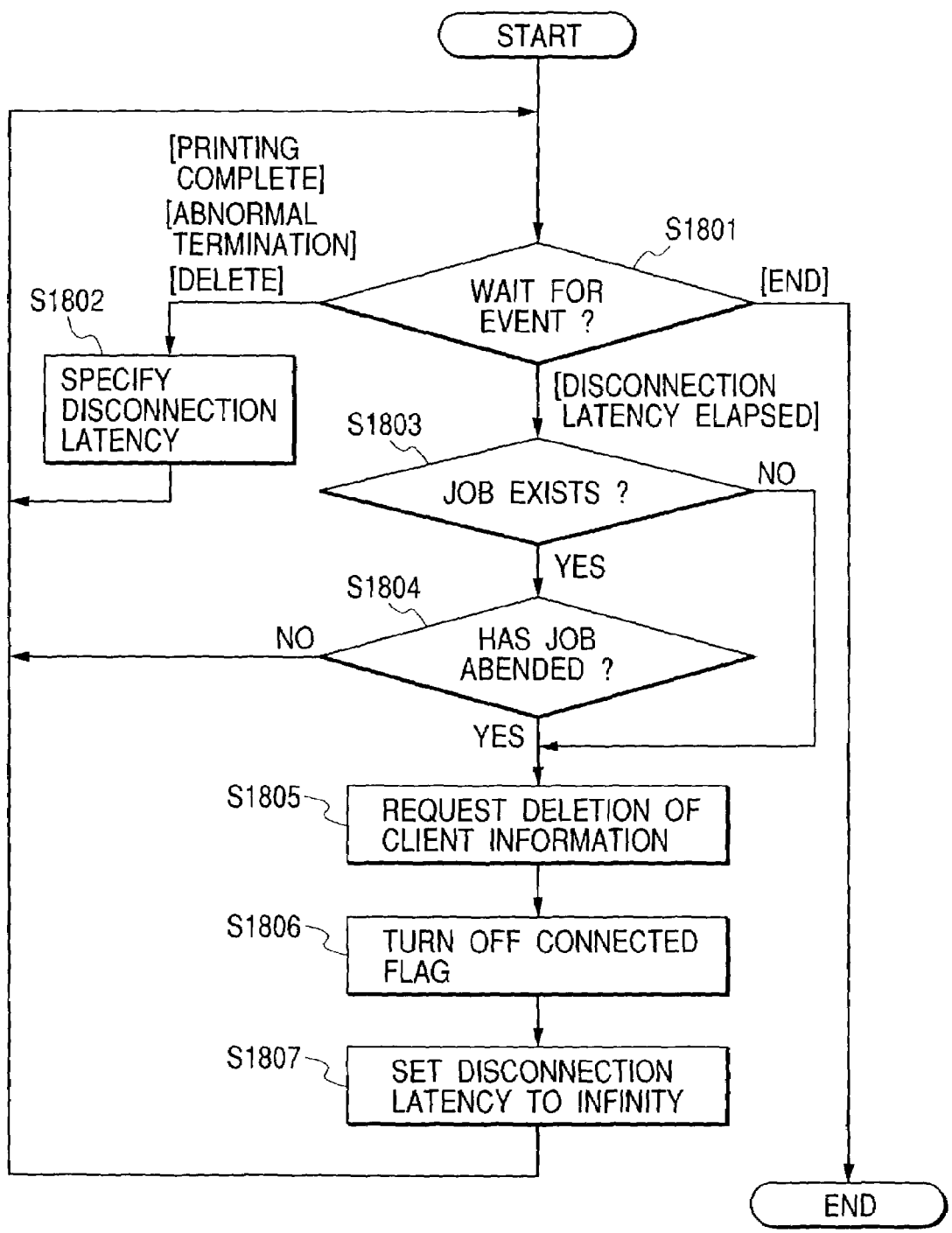
FIG. 18 is a flowchart showing the process (on the client side) of releasing a connection with a server according to a second embodiment.

FIG. 18 is a flowchart showing a flow of processes performed by a thread when the client-side print system 707 releases connection with the server-side print system 708 after a disconnection latency, wherein the thread is generated in the "connect only during printing" mode. The process of each step in FIG. 18 is implemented when a CPU mounted in the device in charge of the process reads and executes program code for running the process.

In Step S1801, the client-side print system 707 waits until any of the following events occurs: a Printing Complete event, Print Job Abend event, Delete Print Job event, Disconnection Latency Elapsed event, and End event. A Printing Complete event is issued when a Printing Complete notice is received from the server-side print system 708, a Print Job Abend event is issued if a print job terminates but it is not known, i.e., it cannot be confirmed, whether the printing has been completed, a Delete Print Job event is issued when a user specifies to delete a print job (stop a printing process), a Disconnection Latency Elapsed event is issued when a disconnection latency elapses, and an End event is issued when the client-side print system 707 terminates.

If a Disconnection Latency Elapsed event occurs in Step S1801, the same processes as in Steps S1503 to S1507 in FIG. 15 described above are performed in Steps S1803 to S1807.

Third Embodiment

In this embodiment, which is an advanced version of the first or second embodiment, connection modes of the client are managed efficiently by the server. As is the case with the second embodiment, configurations and functions of individual devices in the third embodiment are the same as those of the first embodiment described at least with reference to FIGS. 1 to 9.

Figure 19:
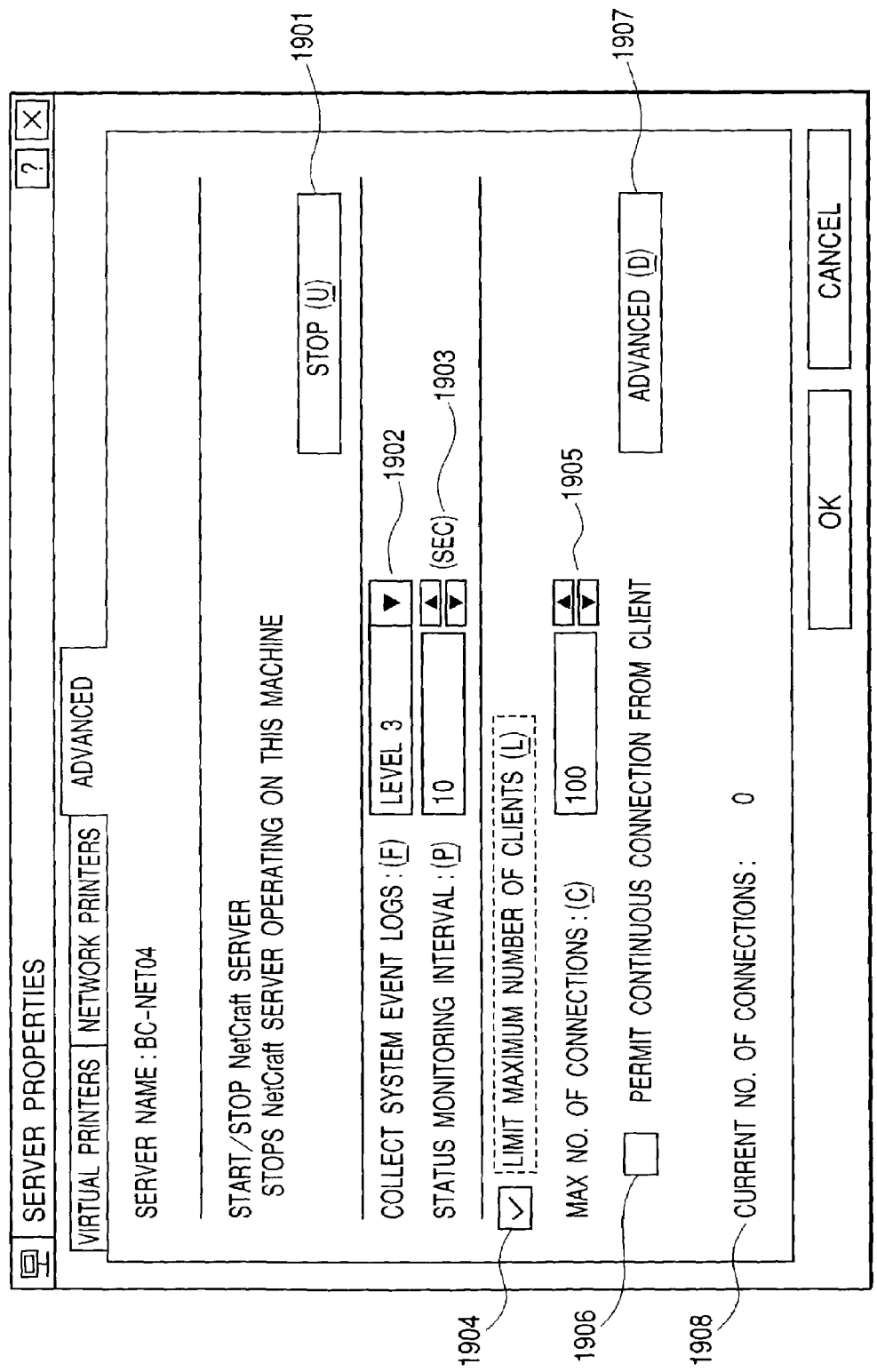
FIG. 19 is a diagram showing a display screen used to set the maximum number of clients accepted by a server according to a third embodiment.

FIG. 19 is a diagram showing a display screen used to set the maximum number of clients accepted by a server according to the third embodiment. This screen is an advanced version of the configuration screen shown in FIG. 17.

By checking 1904 to limit the number of clients allowed to connect to the server-side print system 708 (server connection mode of the client is fixed at "connect only during printing") and checking 1906, it is possible to allow only a particular client-side print system 707 to change the server connection mode to "always connect."

Figure 20:
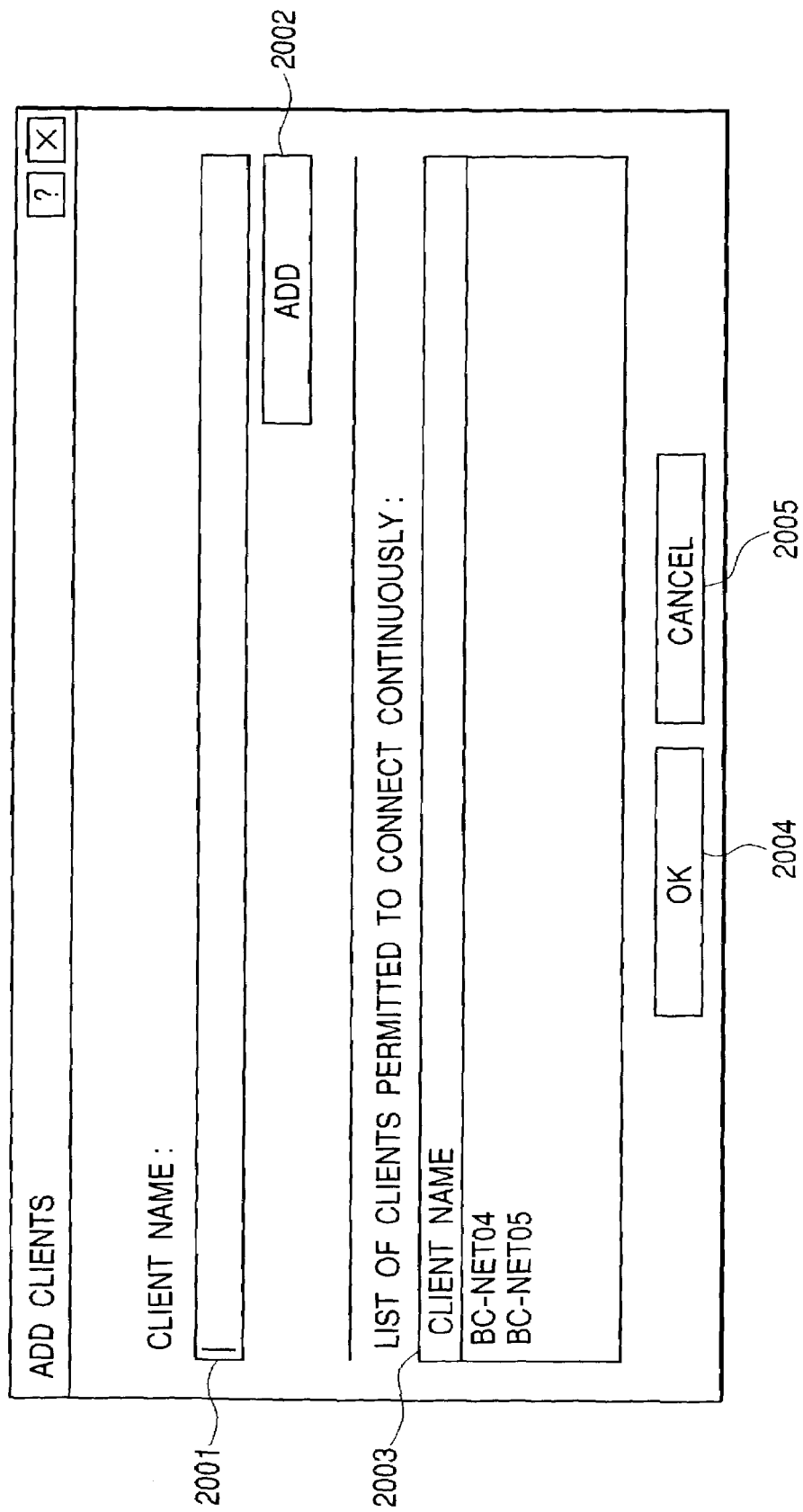
FIG. 20 is a diagram showing a display screen used to specify clients that are allowed continuous connection by the server according to the third embodiment.

Clicking a button 1907 brings up a screen shown in FIG. 20. When the name of a client to be allowed to change the server connection mode is entered in an input area 2001 and a button 2002 is clicked, the entered name is displayed in a client name list 2003. Clicking a button 2004 exits the screen in FIG. 20 and updates, in the server-side print system 708, a name list of the clients that are allowed continuous connection.

If 1904 in FIG. 19 is checked, the connection mode (1604 in FIG. 16) of the client-side print system 707 defaults to "connect only during printing." When attempting to change the server connection mode of a client-side print system 707 to "always connect," any client permitted on the screen in FIG. 20 by the server-side print system 708 can change the server connection mode, but in the case of a client that is not allowed continuous connection, a message is displayed stating that continuous connection is not permitted.

Figure 21:
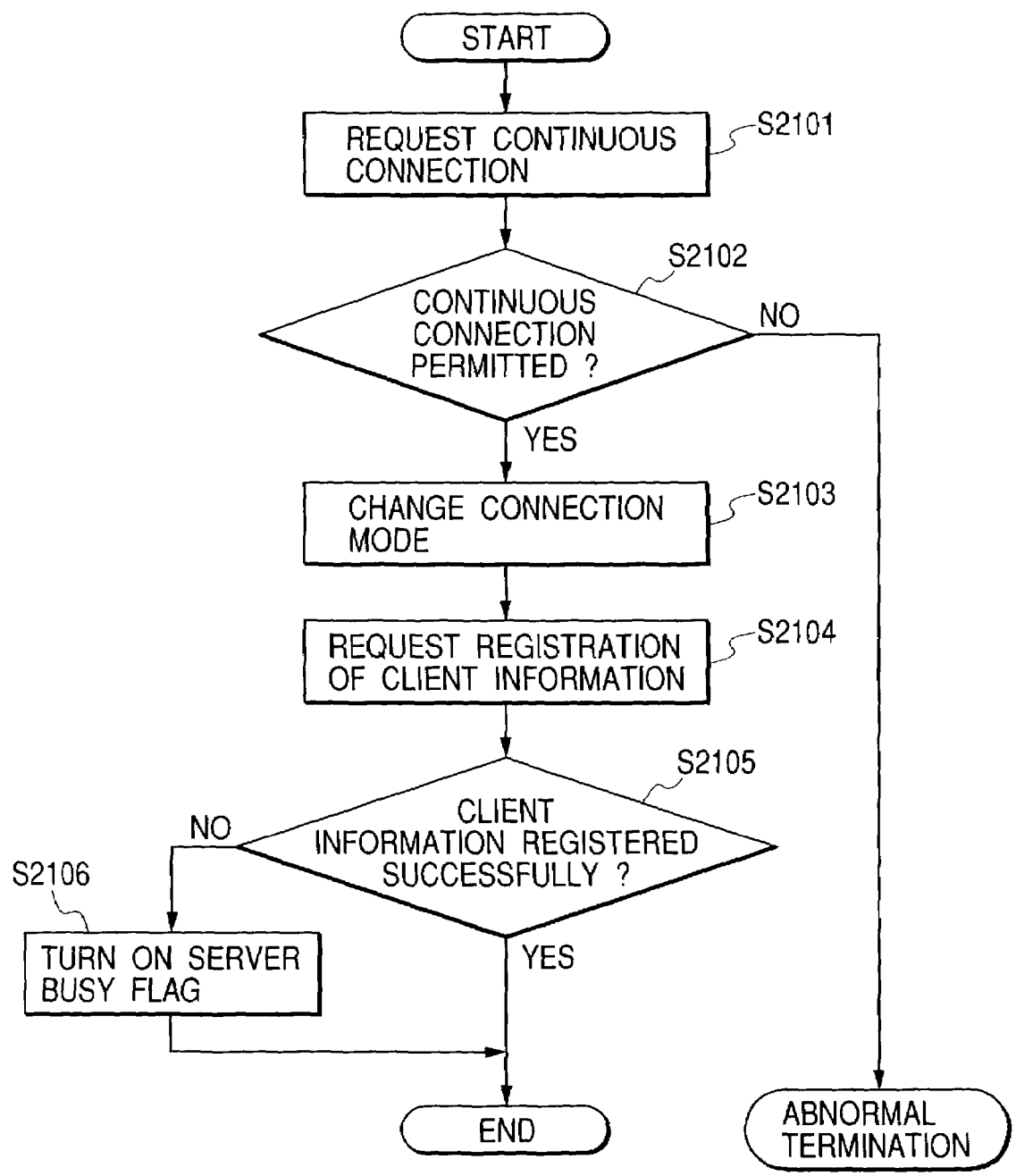
FIG. 21 is a flowchart showing processes performed by a client-side print system according to the third embodiment when requesting continuous connection with the server.
Figure 22:
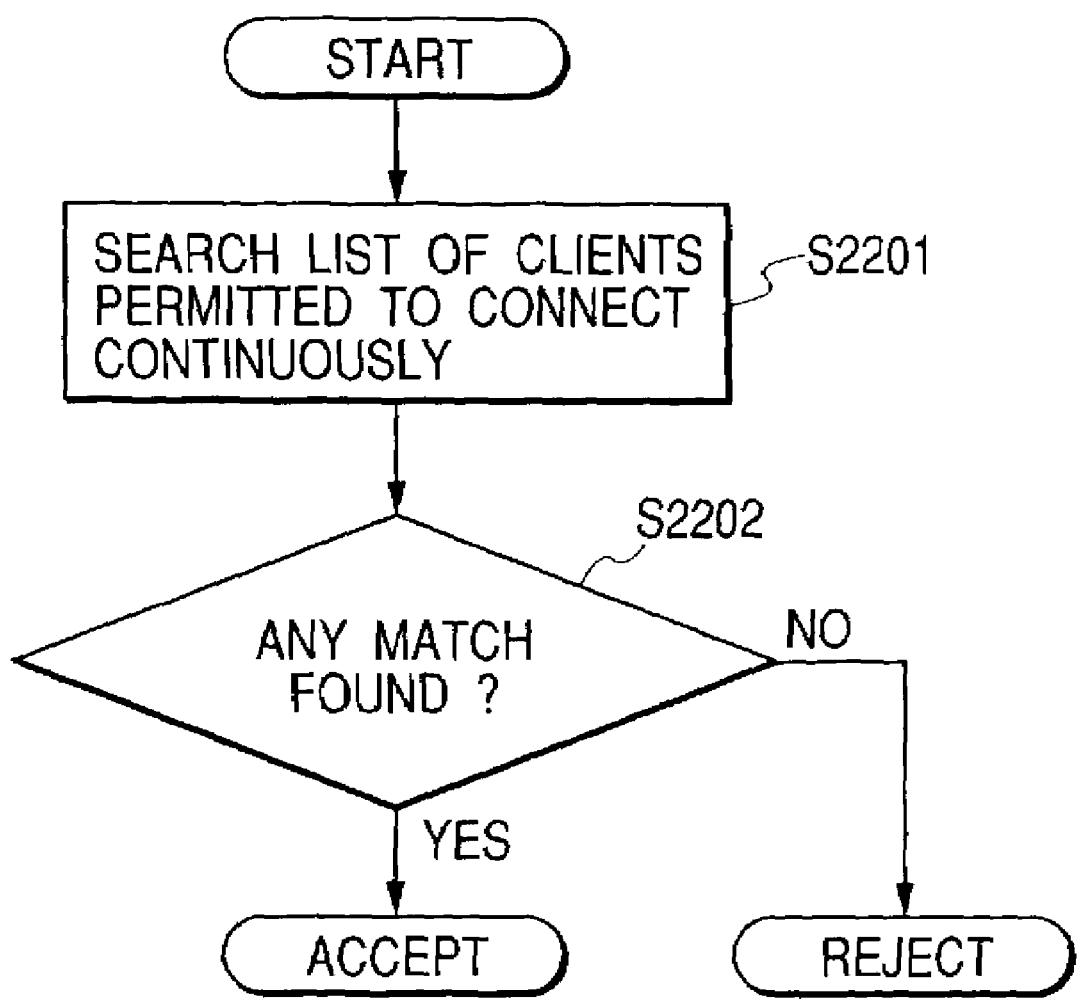
FIG. 22 is a flowchart showing processes performed by the server side according to the third embodiment after receiving a request for continuous connection.

FIGS. 21 and 22 are flowcharts showing processes performed by the client-side print system 707 and server-side print system 708, respectively, when the server connection mode of the client is changed. The process of each step in FIGS. 21 and 22 is implemented when a CPU mounted in the device in charge of the process reads and executes program code for running the process.

When the connection mode (1604 in FIG. 16) of the client-side print system 707 is changed from "connect only during printing" to "always connect," the client-side print system 707 requests the server-side print system 708 in Step S2101 to allow continuous connection. In Step S2102, the client-side print system 707 judges whether continuous connection has been permitted by the server-side print system 708. If it has been, the client-side print system 707 changes the server connection mode in the client in Step S2103 and goes to Step S2104. The client-side print system 707 registers client information with the server-side print system 708 in Step S2104 and judges in Step S2105 whether the client information has been registered successfully. If it is judged in Step S2105 that the client information has been registered successfully, the client-side print system 707 finishes processing. Otherwise, it turns on the Server Busy flag in Step S2106 and finishes processing.

If it is judged in Step S2102 that continuous connection has not been permitted by the server-side print system 708, the client-side print system 707 terminates the process abnormally and the print system UI 711 displays an error message.

Upon receiving the request for continuous connection (Step S2102 in FIG. 21) from the client, the server-side print system 708 searches the name list of the clients that are allowed continuous connection, in Step S2201 of FIG. 22. The server-side print system 708 judges in Step S2202 whether the name of the requesting client has been found in the list. If it is judged that the client name has been found in the list, the server-side print system 708 allows the client continuous connection. If it is judged in Step S2202 that the client name has not been found in the list, the server-side print system 708, rejects the client's request for continuous connection.

Incidentally, the present invention is not limited to the above embodiments. It may be applied either to a system consisting of two or more apparatus or to equipment consisting of a single apparatus. Needless to say, the object of the present invention can also be achieved by a storage medium containing the software program code that implements the functions of the above embodiments: it is supplied to a system or apparatus, whose computer (or a CPU or MPU) then reads the program code out of the storage medium and executes it.

In that case, the program code itself read out from the storage medium will implement the functions of the above embodiments, and the storage medium which stores the program code will constitute the present invention. As the storage medium for supplying the program code, for example, a floppy (registered trademark) disk, hard disk, optical disk, magneto-optical disk, CD-ROM, CD-R, magnetic tape, non-volatile memory card, ROM, or the like may be used. The functions of the above embodiments may be implemented not only by the program code read out and executed by the computer, but also by part or all of the actual processing executed, in accordance with instructions from the program code, by an OS running on the computer.

Furthermore, the functions of the above embodiments may also be implemented by part or all of the actual processing executed by a CPU or the like contained in a function expansion board inserted in the computer or a function expansion unit connected to the computer if the processing is performed in accordance with instructions from the program code that has been read out of the storage medium and written into memory on the function expansion board or unit.

As described above, according to the present invention, since the higher-level device manages only the devices which are performing printing or other processes, the load on the higher-level device can be reduced and the performance of the overall system can be kept at a high level even if the number of devices on the network increases.

Also, since the number of devices which can be registered with the higher-level device is kept within certain limits the load on the higher-level device can also be kept within certain limits and the performance of the overall system can be kept at a high level even if the number of devices on the network increases.

Furthermore, since information processing apparatuss are connected to the higher-level device only during printing and an upper limit is placed on the number of devices registered with the higher-level device, information processing apparatuss can be registered with the higher-level device more flexibly. Consequently, a large number of information processing apparatuss can request the higher-level device to allow registration. Also, the processing load can be kept at a low level because the higher-level device does not accept user registration in excess of a limit value.

Besides, devices which are allowed not only to connect during printing, but also to connect continuously can be registered with the higher-level device and if a request for continuous connection from a device which is not allowed continuous connection is rejected by the higher-level device, a message is displayed on screen notifying the requesting device about the rejection. Therefore, the higher-level device can efficiently manage devices which are allowed connection only during printing and devices which are allowed continuous connection.

What is claimed is:

1. An information processing apparatus which communicates with a print control apparatus for executing transmission scheduling of print jobs retained in a plurality of information processing apparatuses including said information processing apparatus, comprising:

a job retaining unit adapted to retain a print job;

a client information registration unit adapted to register client information for said information processing apparatus in the print control apparatus;

a job information registration unit adapted to register job information corresponding to each of a plurality of print jobs in the print control apparatus;

a job output unit adapted to output the print job retained by said job retaining unit in response to reception of an output instruction from the print control apparatus, the output instruction being provided by the transmission scheduling of the print job executed based on the client information registered by said client information registration unit;

a receiving unit adapted to receive a notification about a status of a printer, the notification being provided by the print control apparatus based on the client information registered by said client information registration unit; and a client information deletion unit adapted to delete the client information registered in the print control apparatus by said client information registration unit based on a notification that printing of the print job outputted by said job output unit is completed, wherein, even if printing of one of the plurality of print jobs is completed, said client information deletion unit does not delete the client information registered in the print control apparatus in the case where other job information exists in the print control apparatus which corresponds to another of the plurality of print jobs for which printing is not completed and which is registered by a same client.

2. An information processing apparatus according to claim 1, wherein said client information deletion unit deletes the registered client information when a predetermined time has elapsed after the printing of the print job is completed.

3. An information processing apparatus according to claim 1, further comprising a discrimination unit adapted to discriminate if any of the plurality of pieces of job information exists in the print control apparatus which corresponds to one of the plurality of print jobs for which printing is not completed, when printing of one of the plurality of print jobs is completed, wherein said client information deletion unit does not delete the registered client information if said discrimination unit discriminates that that piece of job information exists.

4. An information processing apparatus according to claim 3, wherein if the one piece of job information which corresponds to one of the plurality of print jobs for which printing is not completed shows an error status, said client information deletion unit deletes the registered client information.

5. An information processing apparatus according to claim 1, wherein the print control apparatus monitors a print process of the print job and informs said information processing apparatus that the printing of the print job is completed, based on the client information registered by said client information registration unit.

6. An information processing apparatus according to claim 1, wherein the number of pieces of the client information to be registered in the print control apparatus can be limited to a predetermined value, and registration of the client information by said client information registration unit is accepted or rejected based on the predetermined value.

7. An information processing apparatus according to claim 1, wherein said data output unit outputs the print job retained by said data retaining unit to a printing apparatus which communicates with the print control apparatus, in response to the reception of the output instruction from the print control apparatus.

8. A method by which an information processing apparatus communicates with a print control apparatus for executing transmission scheduling of a print job retained in a plurality of information processing apparatuses including said information processing apparatus, said method comprising:

a job retaining step of retaining a print job;

a client information registration step of registering client information for said information processing apparatus in the print control apparatus;

a job information registration step of registering job information corresponding to each of a plurality of print jobs in the print control apparatus;

a job output step of outputting the print job retained in said job retaining step in response to reception of an output instruction from the print control apparatus, the output instruction being provided by the transmission scheduling of the print job executed based on the client information registered in said client information registration step;

a receiving step of receiving a notification about a status of a printer, the notification being provided by the print control step based on the client information registered by said client information registration step; and a client information deletion step of deleting the client information registered in the print control apparatus in said client information registration step based on a notification that printing of the print job outputted in said job output step is completed, wherein, even if printing of one of the plurality of print jobs is completed, said client information step does not delete the client information registered in the print control apparatus in the case where other job information exists in the print control apparatus which corresponds to another of the plurality of print jobs for which printing is not completed and which is registered by a same client.

9. A method according to claim 8, wherein said client information deletion step deletes the registered client information when a predetermined time has elapsed after the printing of the print job is completed.

10. A method according to claim 8, further comprising a discrimination step of discriminating if any of the plurality of pieces of job information exists in the print control apparatus which corresponds to one of the plurality of print jobs for which printing is not completed, when printing of one of the plurality of print jobs is completed, wherein said client information deletion step does not delete the registered client information if said discrimination step discriminates that that piece of job information exists.

11. A method according to claim 10, wherein if the one piece of job information which corresponds to one of the plurality of print jobs for which printing is not completed shows an error status, said client information deletion step deletes the registered client information.

12. A method according to claim 8, wherein the print control apparatus monitors a print process of the print job and informs said information processing apparatus that the printing of the print job is completed, based on the client information registered in said client information registration step.

13. A method according to claim 8, wherein the number of pieces of the client information to be registered in the print control apparatus can be limited to a predetermined value, and registration of the client information in said client information registration step is accepted or rejected based on the predetermined value.

14. A method according to claim 8, wherein said data output step outputs the print job retained in said data retaining step to a printing apparatus which communicates with the print control apparatus, in response to the reception of the output instruction from the print control apparatus.

15. A computer-readable storage medium storing a computer program for an information processing apparatus which communicates with a print control apparatus for executing transmission scheduling of a print job retained in a plurality of information processing apparatuses including said information processing apparatus, comprising:

a job retaining step of retaining a print job;

a client information registration step of registering client information for said information processing apparatus in the print control apparatus;

a job information registration step of registering job information corresponding to each of a plurality of print jobs in the print control apparatus;

a job output step of outputting the print job retained in said job retaining step in response to reception of an output instruction from the print control apparatus, the output instruction being provided by the transmission scheduling of the print job executed based on the client information registered in said client information registration step;

a receiving step of receiving a notification about a status of a printer, the notification being provided by the print control apparatus based on the client information registered by said client information registration step; and a client information deletion step of deleting the client information registered in the print control apparatus in said client information registration step based on a notification that printing of the print job outputted in said job output step is completed, wherein, even if printing of one of the plurality of print jobs is completed, said client information step does not delete the client information registered in the print control apparatus in the case where other job information exists in the print control apparatus which corresponds to another of the plurality of print jobs for which printing is not completed and which is registered by a same client.

* * * * *

UNITED STATES PATENT AND TRADEMARK OFFICE
CERTIFICATE OF CORRECTION

PATENT NO.         : 7,359,075 B2
APPLICATION NO. : 10/278797
DATED                  : April 15, 2008
INVENTOR(S)         : Kimura It is certified that error appears in the above-identified patent and that said Letters Patent is hereby corrected as shown below:

COVER SHEET:
    Item 56, Other Publications, "☐☐" should be deleted; and
    "RFC 2566, 2565, 2068 www.rfc-archive.org.*" should be deleted.

COLUMN 4:
    Line 17, "passes" should read -- pass --.

COLUMN 5:
    Line 8, "he" should read -- the --; and
    Line 31, "transmit and receive" should read -- transmitted and received --.

COLUMN 6:
    Line 27, "the" (second occurrence) should be deleted; and
    Line 28, "all" should read -- all the --.

COLUMN 7:
    Line 39, "(on 709)" should read -- 709 --.

COLUMN 9:
    Line 1, "printing," should read -- printings, --; and
    Line 27, "to" should read -- of --.

COLUMN 10:
    Line 30, "time" should read -- amount of time --.

UNITED STATES PATENT AND TRADEMARK OFFICE
CERTIFICATE OF CORRECTION

PATENT NO. : 7,359,075 B2
APPLICATION NO. : 10/278797
DATED : April 15, 2008
INVENTOR(S) : Kimura It is certified that error appears in the above-identified patent and that said Letters Patent is hereby corrected as shown below:

<u>COLUMN 14</u>:
    Line 35, "apparatuss" should read -- apparatuses --;
    Line 39, "apparatuss" should read -- apparatuses --; and
    Line 41, "apparatuss" should read -- apparatuses --.

Signed and Sealed this

Fourth Day of November, 2008

JON W. DUDAS
*Director of the United States Patent and Trademark Office*